US007624021B2

(12) United States Patent
Stewart et al.

(10) Patent No.: US 7,624,021 B2
(45) Date of Patent: Nov. 24, 2009

(54) UNIVERSAL CONTAINER FOR AUDIO DATA

(75) Inventors: William G. Stewart, Cupertino, CA (US); James E. McCartney, Cupertino, CA (US); Douglas S. Wyatt, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 826 days.

(21) Appl. No.: 10/883,898

(22) Filed: Jul. 2, 2004

(65) Prior Publication Data

US 2006/0020474 A1    Jan. 26, 2006

(51) Int. Cl.
G10L 21/04    (2006.01)
(52) U.S. Cl. .................. 704/500; 704/503; 704/504; 707/104.1; 707/205; 707/E17.143
(58) Field of Classification Search ............... 707/104.1
See application file for complete search history.

(56) References Cited

U.S. PATENT DOCUMENTS

| 6,980,731 | B1 * | 12/2005 | Tahara et al. ............ 386/52 |
| 2002/0162445 | A1 * | 11/2002 | Naples et al. ............ 84/610 |
| 2003/0188182 | A1 * | 10/2003 | Sato et al. ............ 713/193 |
| 2004/0099126 | A1 * | 5/2004 | Kawashima ............ 84/609 |
| 2004/0250078 | A1 | 12/2004 | Stach et al. |
| 2005/0055425 | A1 * | 3/2005 | Lango et al. ............ 709/219 |
| 2005/0066139 | A1 * | 3/2005 | Inoue et al. ............ 711/163 |
| 2005/0154987 | A1 * | 7/2005 | Otsuka et al. ............ 715/716 |
| 2005/0157599 | A1 * | 7/2005 | Kiyama et al. ............ 369/30.03 |
| 2005/0160473 | A1 | 7/2005 | Gal-Oz |
| 2005/0180578 | A1 | 8/2005 | Cho et al. |
| 2005/0226603 | A1 * | 10/2005 | Hirabayashi et al. ............ 386/95 |

(Continued)

FOREIGN PATENT DOCUMENTS

JP    2004-152136    *    5/2004

OTHER PUBLICATIONS

"Notification Concerning Transmittal of International Preliminary Report on Patentability", PCT/US2005/020659, received Jan. 25, 2007, 12 pages.

(Continued)

Primary Examiner—Richemond Dorvil
Assistant Examiner—Leonard Saint Cyr
(74) Attorney, Agent, or Firm—Hickman Palermo Truong & Becker LLP; Adam C. Stone

(57) ABSTRACT

Storing audio data encoded in any of a plurality of different audio encoding formats is enabled by parametrically defining the underlying format in which the audio data is encoded, in audio format and packet table chunks. A flag can be used to manage storage of the size of the audio data portion of the file, such that premature termination of an audio recording session does not result in an unreadable corrupted file. This capability can be enabled by initially setting the flag to a value that does not correspond to a valid audio data size and that indicates that the last chunk in the file contains the audio data. State information for the audio data, to effectively denote a version of the file, and a dependency indicator for dependent metadata, may be maintained, where the dependency indicator indicates the state of the audio data on which the metadata is dependent.

44 Claims, 4 Drawing Sheets

U.S. PATENT DOCUMENTS

| | | | |
|---|---|---|---|
| 2005/0246375 A1* | 11/2005 | Manders et al. | 707/104.1 |
| 2006/0106888 A1* | 5/2006 | Iida et al. | 707/203 |
| 2006/0291805 A1* | 12/2006 | Mita | 386/95 |
| 2007/0003251 A1* | 1/2007 | Chung et al. | 386/96 |

OTHER PUBLICATIONS

Pending claims in corresponding International application No. PCT/US2005/020659, 19 pages.

"Notification of Transmittal of the International Search Report and the Written Opinion of the International Searching Authority, or the Declaration" as received in corresponding International application No. PCT/US2005/020659.

Pending claims in corresponding International application No. PCT/US2005/020659.

Apple Corporation: "Apple Core Audio Format Specification 1.0" XP002346416 retrieved from the Internet: < URL:http://developer.apple.com/documentation/MusicAudio/Reference/CAFSpec/CAFSpec.pdf> retrieved on Sep. 15, 2005.

Microsoft Corporation: "Advanced Systems Format (ASF) Specification. Revision 01.20.02" XP002346417 retrieved from the Internet: < URL http:// download.microsoft.com/download/E/O/6/E06DB390-1E2A-4978-82BB-311810D8A28D/ASF_Specification.doc > retrieved on Sep. 19, 2005.

Angeli, A., "How to programmatically check and fix asf files like asfcheck.exe" retrieved from the Internet < URL: http:///www.tech-archive.net/Archive/Media/microsoft.public.windowsmedia.sdk/2004-04/0225.html > retrieved on May 19, 2006.

Unknown: "DivX Repair Guide, Part 6" XP002346418 retrieved from the Internet: < URL: http://divxstation.com/article.asp?aId=39 &page=6 > retrieved on Sep. 19, 2005.

Bourke, P., "Creating AIFF Audio Formatted files" XP002346419 retrieved from the Internet < URL:http://astronomy.swin.edu.au/{pbourke/dataformats/aiff/ > retrieved on Sep. 19, 2005.

Unknown: "File Formats: Wave files" XP002346438 retrieved from the Internet: < URL: http://www.sonicspot.com/guide/wavefiles.html > retrieved on Sep. 15, 2005.

Unknown: "AVI files and common problems" XP002346420 retrieved from the Internet: < URL:http://www.virtualdub.org/blog/pivot/entry.php?id=25 > retrieved on Sep. 11, 2005.

"Mac OS Sound Including Sound Manager 3.3" Apple Computer, Inc., Technical Publications Apr. 1988: Text on CDROM.

Office action from State Intellectual Property of the People's Republic of China for foreign application No. 200580029600.X; dated Apr. 10, 2009.

Current Claims for PRC foreign application No. 200580029600.X (13 pages).

* cited by examiner

UNIVERSAL CONTAINER FOR AUDIO DATA

FIELD OF THE INVENTION

The present invention relates generally to digital audio and, more specifically, to a universal container for audio data.

BACKGROUND OF THE INVENTION

Standard AIFF, AIFC and WAVE files, which consist of "chunks" of information, are limited to 4 gigabytes. High-resolution audio is now demanding that larger file sizes be possible. For example a 4 gigabyte file with 5.1 (i.e., 6 channels) at 96 KHz sample rate and 24 bits per sample has 41 minutes of play time, and a 4 gigabyte file with 5.1 at 192 KHz sample rate and 32 bit floating point per sample has 15 minutes of play time. With 8, 16, 32 or more channels, the play times become even shorter.

With AIFF and WAVE files, an audio application has two options when recording. The first option is to record the audio data and then update the audio data size field in the file at the end of the recording session. Applications rely on the size field to correctly parse the file. Thus, if an audio application were to terminate prematurely, or there was a power loss while recording, most applications would be unable to read the file because the size field would be incorrect. The second option is to update the size field repeatedly while audio data is written to the file. This process requires significant interactions with the hard disk on which the file is being stored, which significantly and negatively affects performance. Furthermore, if the recording application were to terminate in the midst of updating the size field, the file is also corrupt and unable to be read properly.

With the evolution and complexity of modern audio formats, a more generic and robust means needs to be developed to contain these formats. Based on the foregoing, there is a need for an audio file format that avoids the above-identified limitations of existing audio formats.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION OF EMBODIMENTS OF THE INVENTION

Figure 1:
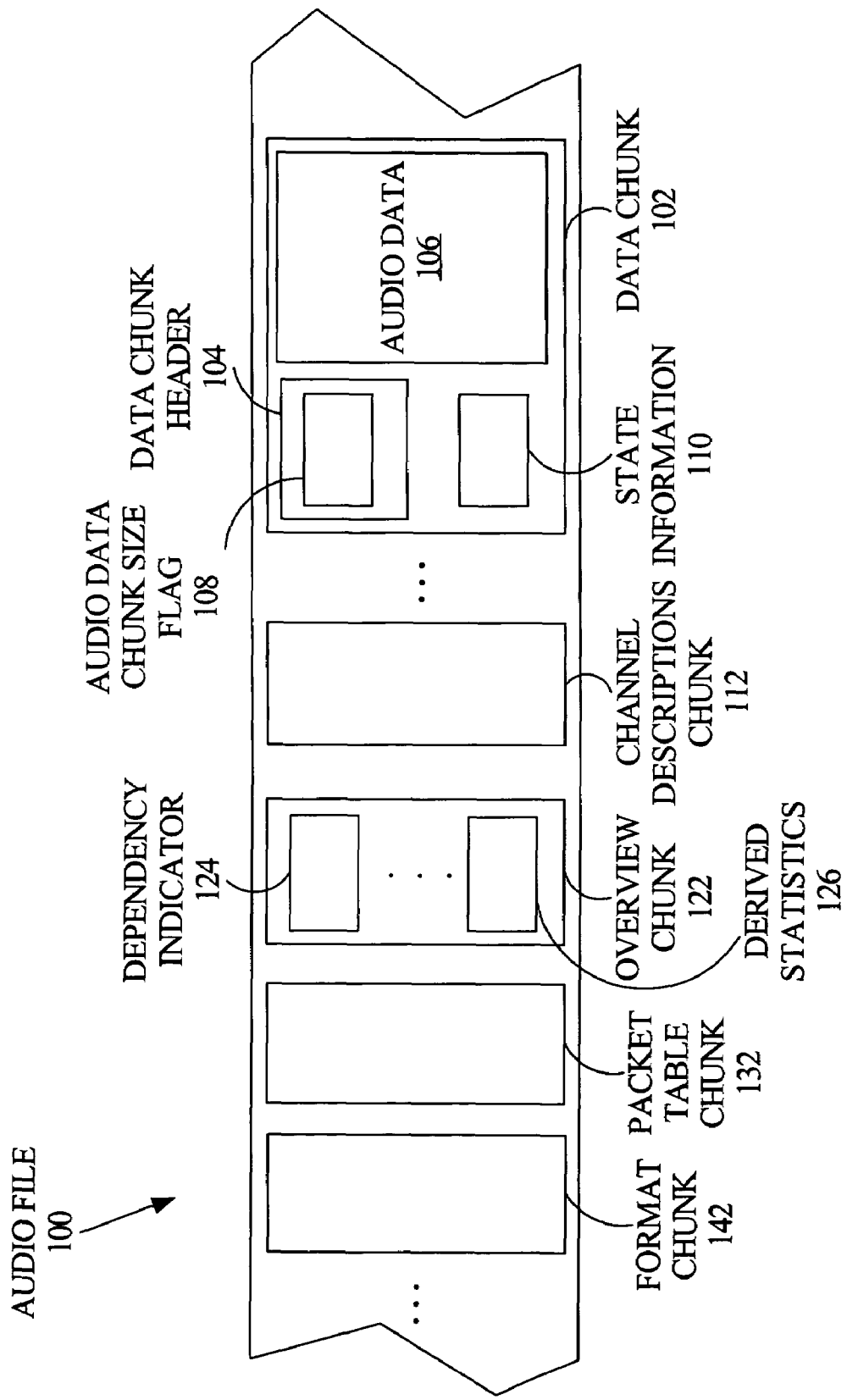
FIG. 1 is a block diagram that illustrates a general layout of an audio file, according to an embodiment of the invention.

In the following description, for the purposes of explanation, numerous specific details are set forth in order to provide a thorough understanding of embodiments of the present invention. It will be apparent, however, that embodiments of the present invention may be practiced without these specific details. In other instances, well-known structures and devices are shown in block diagram form in order to avoid unnecessarily obscuring embodiments of the present invention.

Universal Containment Overview

A universal and extensible container format for audio data (referred to as XAF: Extensible Audio Format) is described, which provides a mechanism for storing audio data encoded in any of a plurality of different audio encoding formats.

In one aspect of the invention, the underlying format in which the audio data is encoded is parametrically defined in an audio format chunk, encapsulating all the information for describing the basic format properties of a stream of audio data. Basic parameters define the properties of an audio stream sufficient to describe any constant bit rate audio format that has channels that are the same size. Additional parameters, defined in a packet table chunk, can be used to describe properties of an audio stream sufficient to describe any variable bit rate format. Based on the specified parameters, the audio data may be accessed and manipulated even when the actual encoding format is not known to the software performing such manipulation. This may be the case, for example, when the audio data is encoded in a format that was developed after the software used to manipulate the audio data. Hence, the container is universal, and extensible, in that it can be used to store audio data in any encoded format, including those presently known as well as those not yet developed. Consequently, any parsers, readers, editors or players of XAF files do not require specific software code for each different audio encoding format that may be contained within an XAF file.

Audio Data Block Size Overview

In another aspect of the invention, a flag is used to manage storage of the size of the audio data portion of the file, such that premature termination of an audio recording session does not result in an unreadable corrupted file. Consequently, restarting the recording of the audio data in another recording session can begin recording where the previous session left off.

In one embodiment, this audio size management capability is enabled by initially setting the flag to a value that does not correspond to a valid audio data size and that indicates that the last chunk in the file contains the audio data. Preferably, the flag is updated to a value that represents the actual audio data size upon successful completion of the recording. Thus, while parsing a file, (1) if the flag has the value that does not correspond to a valid audio data size, then the actual audio data size can be determined based on the size of the audio file and a starting position of the last chunk of the file; and (2) if the flag has a value that is a valid audio data size and that represents the actual audio data size, then the actual audio data size can be determined from the flag. If the flag is not updated to a value that represents the actual audio data size, then the actual audio data size can still be determined based on the size of the audio file and a starting position of the last chunk of the file. The foregoing technique also provides for adding audio data to an existing audio data chunk and for adding metadata chunks after the audio data chunk.

Dependency Tracking Overview

A given audio file, contained according to the universal container format described herein, may include metadata that is dependent on the associated audio data. For example, an overview chunk of the audio file may be used to store information representing an overview of the audio data. In one aspect of the invention, state information for the audio data is maintained in the audio file to effectively denote a version of the file. A dependency indicator is stored for the dependent metadata, where the dependency indicator indicates the state of the audio data on which the metadata is dependent. Hence, it is determinable, at any given time, whether metadata is valid by comparing the dependency indicator for the metadata with the current state information of the audio data.

The foregoing overviews show that the XAF file format simplifies and canonizes both (1) the different types of audio data and (2) the kinds of information that are commonly stored with that audio data. The XAF format provides 64 bit file support, thereby enabling files having longer audio duration than is available with other audio formats and, in one embodiment, multiple channels of audio within a single file are interleaved.

Definition of Terms

Some terms that are used herein are defined as follows.

Sample—One number from one channel.

Frame—One sample for each channel. For example, a frame of stereo audio is two samples, one sample for each of the left and right channels.

Packet—For PCM, one frame. For compressed formats it is something that will decompress to some number of frames. For example, a packet of AAC decompresses to 1024 frames of PCM.

Sample Rate—The number of frames that occur every second. For example, the sample rate for common compact discs (CDs) is 44.1 KHz, or 44100 frames per second (one left channel sample and one right channel sample for each frame). The term "sample rate" is used herein as in common use, however, more accurately in that herein the sample rate is the frame rate, which represents the number of n channels of samples per second. Thus, a common stereo CD plays at 44.1 KHz, which is actually 88200 samples per second.

In the world of codecs, the word "frame" is often used to describe a discrete packet of encoded data. However, the term "packet" is used herein to describe a discrete unit of encoded data. As such, in an encoded audio format, a packet represents the smallest, indivisible block of audio data. In summary, (a) a packet consists of one or more frames, depending on the format; (b) a frame is made up of n channels of samples; and (c) the sample rate describes the number of frames of samples per second.

Overview of Audio Formats

Non-limiting examples of audio formats that can be described using the XAF format include the following:

(A) PCM—8, 12, 16, 24, 32 bit signed integer; 32, 64 bit floating integer, in either big or little endian orderings;

(B) Constant Bit Rate Encoded Audio (e.g., IMA);

(C) Constant Frame, Variable Bit Rate (e.g., AAC, MP3); and (D) Variable Frame, Variable Bit Rate per encoded packet.

Audio data in an XAF file is primarily handled as a packet. The content of an audio data packet differs substantially based on the audio encoding format, but the general approach to reading and writing audio data to an XAF file does not.

Packet Types (A) Constant Bit Rate Formats

Constant bit rate ("CBR") packet types are supported with the XAF format, such as with PCM, PWM, and CBR compressed formats. With CBR formats, the XAF format chunk completely describes the size of each packet of data, and thus a parser can both read and write any packet with no further information.

(B) Variable Bit Rate Formats

With variable bit rate ("VBR") packet types, through the provision of a packet chunk, a parser can both read and write packets to an XAF file without knowing anything about the construction of the bits within these individual packets, regardless of the encoding format of the audio data. In one embodiment, with any audio data encoding format in which an XAF format chunk cannot completely de-lineate the packet boundaries, a packet chunk is used, as described hereafter.

(C) Compressed Formats

VBR data formats can be either internally or externally framed. That is, the boundaries of each packet of audio data is either described within the data stream (internally framed), or is an addendum to the stream (externally framed). MP3, for example, is internally framed, and uses synch markers to add integrity to packet marks. MPEG 4-AAC is externally framed, in that the packet boundaries are stored externally to the data stream.

With externally framed packets, there is no need to provide special knowledge to a particular bit stream in order to parse that bit stream, while either reading or writing the file. Furthermore, when data is internally framed, the parser has to parse the entire data segment to know where packet boundaries are, how long the file is, etc., which imposes a considerable cost when opening a file to be read (which is by far the most common practice).

The format of each packet of a compressed format in an XAF file will have a described data format, which is typically described by the Standards or Industry body that has responsibility for the compressed format. For example, MP3 (to be precise, MPEG 1 & 2, Layer 3) packet format contains (1) Start: Start of Synch Word; and (2) End: byte before the beginning of the Next Synch Word. For another example, AAC utilizes MPEG4 Defined Access Unit. However, as a parser of an XAF file, the sole responsibility is to read and write the packets, based on the boundaries described by the packet table. The codec, as the generator or consumer of these packets, is responsible for providing and consuming audio data having the specified constructions.

Specific Types of XAF Chunks

In one embodiment, the data structure values found within an XAF file are in network (big-endian) order. In one embodiment, standard-specified chunks are delineated (including the mFileType ID) with lower case characters, i.e., using characters only within the ASCII range of 'a' to 'z', including both the <space> and '.' characters. In one embodiment, user-defined chunk types or information keys include at least one byte value outside of the foregoing range in the 4 byte mChunkType field of an XAF Chunk Header. In one embodiment, users adding chunk definitions use the 'uuid' chunk type and semantics as described below.

Preferred Chunks

An XAF file may contain various types of chunks of information. Some of the types of chunks available for an XAF file are referred to as "preferred" chunks in that they are considered fundamental chunks of an XAF file, necessary for capturing some fundamental features offered by the XAF file format.

The preferred chunks include the following, each of which is described hereafter:

(A) XAF File Header Chunk;

(B) Format Chunk, which comprises a description of the attributes (i.e., parameters) of the audio stream, according to the underlying encoding scheme in which the audio data is encoded; and (C) Data Chunk, which comprises the actual audio data. In one embodiment, the size of the data chunk may be unspecified or set to an invalid size (e.g., set to a value of −1), which indicates that the data chunk is the last chunk in the file and that all the content from the start of the data chunk to the end of the file is audio data. If the size is greater than zero, then there can be additional chunks after the data chunk, and the size is used to determine the actual size of the contained audio data.

In addition, with VBR data, a packet table chunk is used. Furthermore, a magic cookie chunk is used if it is required by the format, as described hereafter.

In one embodiment, the file header chunk, format chunk and data chunk are all required for an XAF file.

Recommended Chunk

As mentioned, an XAF file may contain various types of chunks of information, with preferred chunks considered the chunks that capture fundamental aspects of the XAF file format. Additional aspects of the XAF file format can be captured by using one or more types of chunks referred to as "recommended" chunks, in that they are recommended for use in an XAF file.

One recommended chunk is as follows, which is described in more detail hereafter.

(A) Channel Descriptions Chunk. A channel description describes the meanings and orderings of the channels contained within the XAF file. For single channel or dual channel data, the absence of a channel descriptions chunk implies mono or stereo (left/right) audio, respectively. The channel descriptions chunk is described in more detail hereafter.

An additional recommendation is that the data size in the data chunk is correctly set to the actual size of the audio data.

Optional Chunks

Additional aspects of the XAF file format can be captured by using one or more types of chunks referred to as "optional" chunks, in that they are optional for use in an XAF file. One or more optional chunks may be used in an XAF file to provide a more feature-rich audio file. The optional chunks are listed below, with each described in more detail hereafter.

(A) Markers Chunk;
(B) Regions Chunk;
(C) Overview Chunk;
(D) Peak Chunk;
(E) UMID Chunk;
(F) Information Chunk;
(G) Edit Comments Chunk; and
(H) MIDI Chunk.

General XAF File Layout

XAF File Layout Example

FIG. 1 is a block diagram that illustrates a general layout of an audio file, according to an embodiment of the invention. Audio file 100 comprises a set of chunks of information, generally including audio data and metadata. FIG. 1 illustrates some of the possible chunks that may be present in an XAF audio file. However, the depiction of audio file 100 is not an exhaustive illustration of all of the chunks that may be present in such a file, nor are all of the chunks depicted in audio file 100 necessary for all embodiments of the invention. The order in which the chunks are depicted in audio file 100 is arbitrary, unless otherwise indicated herein.

Referencing from right to left, audio file 100 comprises a data chunk 102, a channel descriptions chunk 112, an overview chunk 122, a format chunk 132 and a packet table chunk 142, each of which are described in detail herein.

Data chunk 102 comprises a data chunk header 104, audio data 106, and state information 110. The data chunk header 104 comprises various information, or metadata, such as an audio data chunk size flag 108 (referred to as mChunkSize elsewhere herein). Audio data chunk size flag 108 (as well as similar flags for each chunk) contains a value that, at times, indicates the size of the audio data 106. Other values contained in audio data chunk size flag 108 may have other meanings, such as the use in one embodiment of "−1" for the audio data chunk size flag 108, to indicate that the data chunk 102 is the last chunk in audio file 100 (described in more detail herein). State information 110 contains information that identifies the current version of the audio data 106 in data chunk 102. As described in more detail herein, state information 110 can be compared against a dependency indicator from other chunks that are dependent on (e.g., derived from) audio chunk 102 (such as dependency indicator 124 from overview chunk 122), to determine whether information in the dependent chunk is still valid in view of the current version of the audio data 106.

Channel description chunk 112 contains a set of audio channel descriptions, which, in one embodiment, specify both the order and the location (i.e., the role or usage) of each of the channels that are contained within the file. Channel descriptions chunk 112 is described in more detail herein.

As mentioned, in one embodiment, overview chunk 122 contains a dependency indicator 124, which indicates a version of information from which overview data, such as derived statistics 126, are derived. For example, derived statistics 126 are derived from a particular version of audio data 106, which is identified by state information 110, and are associated with dependency indicator 124. Thus, if state information 110 of audio chunk 102 matches dependency indicator 124 of overview chunk 122 (or any other similarly functioning dependency indicator from any other chunk in audio file 100 that is dependent on audio data 106), then the overview information in overview chunk 122 can be considered still valid, as derived. Overview chunk 122 is described in more detail herein.

Packet table chunk 132 is used for VBR encoding formats. The packet table chunk 132 expresses the characteristics of the encoded bit stream, such as the audio stream's (1) duration in sample frames, (2) any additional priming frames, and (3) remainder frames, each of which is described in more detail herein. Packet table chunk 112 is described in more detail herein.

Format chunk 142 contains information that describes the format of the audio data contained within the file, i.e., audio data 106. Format chunk 142, along with packet table chunk 132, enables the self-describing, (i.e., universal) functionality of an XAF audio file, such as audio file 100, so that software processing such an audio file is not required to know, a priori, about the particular format in which the audio data is encoded. Format chunk 142 is described in more detail herein.

XAFFileHeader

In one embodiment, an XAF file begins with a file header, "XAFFileHeader", which can be structured as depicted hereafter. The file header is followed by a series of chunks of data or metadata. In one embodiment, the values contained in the fields of the file header are ordered in big endian order.

```
struct XAFFileHeader
{
    UInt32    mFileType;        // '.xaf'
    UInt16    mFileReserved;
    UInt16    mFileVersion;
};
```

XAFChunkHeader

In one embodiment, every chunk is preceded by a chunk header (e.g., data chunk header 104 of FIG. 1), "XAFChunkHeader", which can be structured as depicted hereafter. In one embodiment, the values contained in the fields of the chunk header are ordered in big endian order.

```
struct XAFChunkHeader
{
    UInt32    mChunkType;
    UInt16    mChunkFlags;
    UInt16    mChunkVersion;
    SInt64    mChunkSize;
};
``` where,
mChunkType is the type of chunk for which the chunk header applies, which, in one embodiment, is a four character, big endian ordered code;
mChunkFlags are used to describe any differences in the data of a chunk that can affect how a given chunk's data would be interpreted;
mChunkVersion is used to provide a version number of a chunk's format. It is conceivable that a given chunk's format may be different in a future revision of the XAF file format, in which case the version of the chunk would be revised to reflect such changes.
mChunkSize is the size of the data chunk that follows, not including this header, which, in one embodiment, is represented in a number of bytes.

Format Description

In one embodiment, the first chunk after the file header is the format chunk (e.g., format chunk 142 of FIG. 1), "XAFAudioFormat", which describes the audio encoding format using parameter values. In one embodiment, the format chunk must precede the audio data chunk. In one embodiment, the header for the format chunk, "formatChunkHeader", is structured as depicted hereafter.
formatChunkHeader
XAFChunkHeader formatChunkHeader;
formatChunkHeader.mChunkType='desc';
formatChunkHeader.mChunkFlags=0;
formatChunkHeader.mChunkVersion=0;
formatChunkHeader.mChunkSize=32;

where,
the mChunkType field identifies the type of chunk as a description (i.e., format description) chunk; and
the mChunkSize field identifies the chunk size as 32 bytes.

In the foregoing example header, both the flags and version fields of the format chunk header are set to a default value of zero.

XAFAudioFormat

An audio format chunk, "XAFAudioFormat", follows the format chunk header. The audio format chunk describes the format of the audio data contained within the file. In one embodiment, the audio format chunk is structured as depicted hereafter.

```
struct XAFAudioFormat
{
    Float64    mSampleRate;
    UInt32     mFormatID;
    UInt32     mFormatFlags;
    UInt32     mBytesPerPacket;
    UInt32     mFramesPerPacket;
    UInt32     mChannelsPerFrame;
    UInt32     mBitsPerChannel;
};
```

The audio format chunk encapsulates all the information necessary for describing the basic format properties of a stream of audio data. This information included in the audio format structure is sufficient to describe any constant bit rate format that has channels that are the same size. Additional information is required for variable bit rate data, as described hereafter in reference to the Packet Table chunk. A value of "0" indicates that the field is either unknown, not applicable, or is otherwise inappropriate for the format and should be ignored. Note that "0" can be a valid value for some formats in the mFormatFlags field.

Each of the parameter fields in the audio format chunk is described hereafter.

mSampleRate—The number of sample frames per second of the audio data in the audio stream. In one embodiment, this is an IEEE-754 floating point representation.

mFormatID—A four character code indicating the general kind of data in the stream.

mFormatFlags—Flags specific to each format.

mBytesPerPacket—The number of bytes in a packet of data.

mFramesPerPacket—The number of sample frames in each packet of data.

mChannelsPerFrame—The number of channels in each frame of data.

mBitsPerChannel—The number of bits of sample data for each channel in a frame of data.

mFormatID

The following are defined values for the mFormatID field. This is an exemplary, non-exhaustive and non-limiting list of values.

```
enum
{
    kAudioFormatLinearPCM    = 'lpcm',
    kAudioFormatAppleIMA4    = 'ima4',
    kAudioFormatMPEG4AAC     = 'aac',
    kAudioFormatMACE3        = 'MAC3',
    kAudioFormatMACE6        = 'MAC6',
    kAudioFormatULaw         = 'ulaw',
```

```
        kAudioFormatALaw           = 'alaw',
        kAudioFormatMPEGLayer3     = '.mp3',
        kAudioFormatAC3            = 'ac-3',
        kAudioFormat60958AC3       = 'cac3'
};
```

Each of the foregoing values for the mFormatID field is described hereafter.

kAudioFormatLinearPCM—Linear PCM, uses the PCM related flags discussed below.

kAudioFormatAppleIMA4—Apple's implementation of IMA 4:1 ADPCM; has no flags.

kAudioFormatMPEG4AAC—MPEG-4 AAC; the flags field contains the MPEG-4 audio object type constant indicating the specific kind of data.

kAudioFormatMACE3—MACE 3:1; has no flags.

kAudioFormatMACE6—MACE 6:1; has no flags.

kAudioFormatULaw—µLaw 2:1; has no flags.

kAudioFormatALaw—aLaw 2:1; has no flags.

kAudioFormatMPEGLayer3—MPEG-1 or -2, Layer 3 audio; has no flags.

kAudioFormatAC3—AC-3; has no flags.

kAudioFormat60958AC3—AC-3 packaged for transport over an IEC 60958 compliant digital audio interface; uses the standard flags for this format.

mFormatFlags

For formats that require further delineation, the mFormatFlags field is used. In cases where there is no further delineation, this field should be set to zero. Any flags that are not specified for any of the published formats are reserved for future use. For compatibility, those flag bits (or flag values) should be set to zero. The following are defined values for the mFormatFlags field. This is an exemplary, non-exhaustive and non-limiting list of values.

(A) Linear PCM Flags:

```
enum
{
    kXAFLinearPCMFormatFlagIsFloat         = (1L << 0),
    kXAFLinearPCMFormatFlagIsLittleEndian  = (1L << 1)
};
```

Each of the foregoing values for the mFormatFlags field is described hereafter. The flags field for Linear PCM, when set to zero, represents integer, big endian sample format.

kXAFLinearPCMFormatFlagIsFloat—Set for floating point, clear for integer.

kXAFLinearPCMFormatFlagIsLittleEndian—Set for little endian, clear for big endian.

(B) AAC Flags

These flags take on the MPEG-4 Audio Object types that are defined for AAC.

```
enum
{
    kMP4Audio_AAC_Main_ObjectType     = 1,
    kMP4Audio_AAC_LC_ObjectType       = 2,
    kMP4Audio_AAC_SSR_ObjectType      = 3,
    kMP4Audio_AAC_LTP_ObjectType      = 4,
    kMP4Audio_AAC_Scalable_ObjectType = 6,
    kMP4Audio_ER_AAC_LC_ObjectType    = 17,
    kMP4Audio_ER_AAC_LTP_ObjectType   = 19,
    kMP4Audio_ER_AAC_Scalable_ObjectType = 20
};
```

Each of the foregoing values for the mFormatFlags field is described hereafter.

kMP4Audio_AAC_Main_ObjectType—AAC Main Object.

kMP4Audio_AAC_LC_ObjectType—AAC Low Complexity Object.

kMP4Audio_AAC_SSR_ObjectType—AAC Scalable Sampling Rate Object.

kMP4Audio_AAC_LTP_ObjectType—AAC Long Term Predictor Object.

kMP4Audio_AAC_Scalable_ObjectType—AAC Scalable Object.

kMP4Audio_ER_AAC_LC_ObjectType—Error Resilient(ER) AAC Low Complexity(LC) Object.

kMP4Audio_ER_AAC_LTP_ObjectType—Error Resilient(ER) AAC Long Term Predictor(LTP) Object.

kMP4Audio_ER_AAC_Scalable_ObjectType—Error Resilient(ER) AAC Scalable Object.

Any other values used for the flags field will be dependent on any future revisions of AAC object types by the MPEG-4 standards bodies.

Format Chunk Examples

The following variations of PCM audio should be supported by all XAF parsers:

(1) any sample rate; (2) samples of 16, 24 and 32 bit signed integer (both big and little endian); and (3) samples of 32 and 64 bit float (both big and little endian). In one embodiment, the floating point values are conformant to the IEEE-754 specification.

There are two possible ways that 24 bit samples are stored within a file, and both are reasonably common: (1) packed within 3 bytes; and (2) packed within a 4 byte container. Both ways of packing are described hereafter.

Linear PCM

This example is for 16 bit, big-endian stereo, 44.1 KHz audio data. For all PCM formats the bytesPerPacket and framesPerPacket are equivalent (i.e., 1) because, by definition, PCM formats are one frame per packet.

XAFAudioFormat simplePCM16;
simplePCM16.mSampleRate=44100.;
simplePCM16.mFormatID=kAudioFormatLinearPCM;
simplePCM16.mFormatFlags=0; //big endian integer;
simplePCM16.mChannelsPerFrame=2;
simplePCM16.mBitsPerChannel=16;
simplePCM16.mFramesPerPacket=1;
simplePCM16.mBytesPerPacket=4;

The next example is for 24 bit, little-endian stereo, 48 KHz audio data.

XAFAudioFormat simplePCM24;
simplePCM24.mSampleRate=48000.;
simplePCM24.mFormatID=kAudioFormatLinearPCM;
simplePCM24.mFormatFlags=kXAFLinearPCMFormatFlagIsLittleEndian;
simplePCM24.mChannelsPerFrame=2;
simplePCM24.mBitsPerChannel=24;
simplePCM24.mFramesPerPacket=1;
simplePCM24.mBytesPerPacket=6;

In this case, the 24 bits are packed within their containing bytes (i.e., each 24 bit sample takes up 3 bytes in the file). It is also common to reserve 4 bytes per sample for 24 bits. In this case the 24 bits are aligned high within the 4 byte field. The format for this would be described as:

XAFAudioFormat sparsePCM24;
    sparsePCM24.mSampleRate=48000.;
    sparsePCM24.mFormatID=kAudioFormatLinearPCM;
    sparsePCM24.mFormatFlags=kXAFLinearPCMFormat
        FlagIsLittleEndian;
    sparsePCM24.mChannelsPerFrame=2;
    sparsePCM24.mBitsPerChannel=24;
    sparsePCM24.mFramesPerPacket=1;
    sparsePCM24.mBytesPerPacket=8;

As with non-byte aligned sample widths, described hereafter, the samples are high aligned within its containing byte width. A parser can then handle this as if it were 32 bit integer (as the lowest, or least significant 8 bits will all be zero). On disk, this looks like:

(MM is most significant byte, LL is least signficant, XX is mid, and 0 is unused)

00 LL XX MM

A big-endian ordered version of the same layout (24 bit audio in 4 bytes) looks like:

MM XX LL 00

The next example is for 32 bit float, big-endian 6 channels of 96 KHz audio data.

XAFAudioFormat simplePCM96;
    simplePCM96.mSampleRate=96000.;
    simplePCM96.mFormatID=kAudioFormatLinearPCM;
    simplePCM96.mFormatFlags=kXAFLinearPCMFormat
        FlagIsFloat;
    simplePCM96.mChannelsPerFrame=6;
    simplePCM96.mBitsPerChannel=32;
    simplePCM96.mFramesPerPacket=1;
    simplePCM96.mBytesPerPacket=24;

The next example is for 64 bit float, little-endian 4 channels of 192 KHz audio data.

XAFAudioFormat simplePCM192;
    simplePCM192.mSampleRate=192000.;
    simplePCM192.mFormatID=kAudioFormatLinearPCM;
    simplePCM192.mFormatFlags=kXAFLinearPCMFormat
        FlagIsFloat
        |kXAFLinearPCMFormatFlagIsLittleEndian;
    simplePCM192.mChannelsPerFrame=4;
    simplePCM192.mBitsPerChannel=64;
    simplePCM192.mFramesPerPacket=1;
    simplePCM192.mBytesPerPacket=32;
    IMA4

When describing compressed formats in XAF file format (whether variable or constant bit rates and/or frames per packet), the format chunk describes in some part what the result of decompressing the compressed packets will provide. Thus, the format chunk contains the number of channels and the sample rate.

IMA4 is a constant bit rate, constant frames per packet format, which is described in the format chunk as follows.

mSampleRate indicates the sample rate of a single frame of the audio encoded in the compressed packets;
    mChannelsPerFrame describes the number of channels encoded in the compressed packets;
    mFramesPerPacket represents the number of frames encoded in each compressed packet;
    mBitsPerChannel is zero; and
    mBytesPerPacket is a non-zero value.

IMA is shown for purposes of example, however, the foregoing conditions are true for any format of this nature. As a point of information, IMA4 always encodes 64 sample frames into a single packet of 34 bytes per channel. Thus the bytesPerPacket is the channelsPerFrame * 34. Thus, IMA4 data that will provide 44.1 KHz, stereo audio, can be described as follows:

XAFAudioFormat imaDesc;
    imaDesc.mSampleRate=44100.;
    imaDesc.mFormatID=kAudioFormatAppleIMA4;
    imaDesc.mFormatFlags=0;
    imaDesc.mChannelsPerFrame=2;
    imaDesc.mBitsPerChannel=0;
    imaDesc.mFramesPerPacket=64;
    imaDesc.mBytesPerPacket=imaDesc.mChannelsPerFrame * 34;
    AAC MPEG-4 AAC is by definition a variable bit rate, constant frames per packet format. MP3 has varieties that are both CBR (similar to the IMA example above), as well as VBR (similar to this example). For audio formats that provide variable bit rate, constant frames per packets, the following information is used to describe the format:

mSampleRate indicates the sample rate of a single frame of the audio encoded in the compressed packets;
    mChannelsPerFrame describes the number of channels encoded in the compressed packets;
    mFramesPerPacket represents the number of frames encoded in each compressed packet;
    mBitsPerChannel is zero;
    mBytesPerPacket is zero, which indicates that the number of bytes contained in each packet is variable.

Thus, a file containing MPEG-4 AAC (using the Low Complexity Audio Object format), where the encoded data represents 44.1 KHz, stereo audio, can be described as follows:

XAFAudioFormat aacDesc;
    aacDesc.mSampleRate=44100.;
    aacDesc.mFormatID=kAudioFormatMPEG4AAC;
    aacDesc.mFormatFlags=kMP4Audio_AAC_LC_Object
        Type;
    aacDesc.mChannelsPerFrame=2;
    aacDesc.mBitsPerChannel=0;
    aacDesc.mFramesPerPacket=1024;
    aacDesc.mBytesPerPacket=0;

The duration of each packet for both the IMA and AAC type of audio can be calculated by dividing mSampleRate by mFramesPerPacket.

Variable Bit Rate, Variable Frames Per Packet

Some encoded audio formats encode packets that are not only of a variable data size, but are also encoded with a variable number of frames per packet of uncompressed audio source (which will generate a variable number of frames when decompressed). For a format of this nature, the following information applies:

mSampleRate indicates the sample rate of a single frame of the audio encoded in the compressed packets;
    mChannelsPerFrame describes the number of channels encoded in the compressed packets;
    mFramesPerPacket is zero, which indicates that the number of frames contained in each packet is variable;
    mBitsPerChannel is zero;
    mBytesPerPacket is zero, which indicates that the number of bytes contained in each packet is variable.

An example variable bit rate, variable frames per packet audio file can be described as follows:

```
XAFAudioFormat vbr_vfp_Desc;
vbr_vfp_Desc.mSampleRate = sampleRateOfAudio;
vbr_vfp_Desc.mFormatID = kVariableFramesPerPacket;
vbr_vfp_Desc.mFormatFlags = ...; // any flags appropriate to the format
vbr_vfp_Desc.mChannelsPerFrame = numberOfChannelsOfAudio;
vbr_vfp_Desc.mBitsPerChannel = 0;
vbr_vfp_Desc.mFramesPerPacket = 0;
vbr_vfp_Desc.mBytesPerPacket = 0;
```

Formats That Are Not Byte Aligned

An applicable assumption (as is true of existing MPEG audio formats) is that compressed audio formats are byte aligned. However, in some instances, that assumption does not hold true.

Linear PCM

Some PCM bit depths are not byte aligned, for example, 12 bit or 18 bit PCM audio. These formats should adhere to the following requirements: (1) the format is packed within a byte aligned sample width; and (2) the samples are aligned high within the enclosing byte-aligned width. Thus, 12 bit PCM audio data (in the case below, this is big endian) is packed within a 2 byte (16 bit) word, and would be presented as:

XAFAudioFormat PCM12;
PCM12.mSampleRate=44100.;
PCM12.mFormatID=kAudioFormatLinearPCM;
PCM12.mFormatFlags=0; //big endian integer
PCM12.mChannelsPerFrame=2;
PCM12.mBitsPerChannel=12;
PCM12.mFramesPerPacket=1;
PCM12.mBytesPerPacket=4;

A similar scheme would be followed for 18 bit PCM data, where the audio data may be aligned high within a 3 byte (24 bit) word. This allows parsers of this format (except in the case where they take special advantage of the bit depth of the samples) to parse and convert the sample data using the same algorithms as for their byte-aligned format. Thus, in the 12 bit case above, code that parses 16 bit packed data can also parse 12 bit sample data, treating it in the same manner. Specifying that the data is actually 12 bit can present some advantages with some uses of this audio data.

PWM

PWM is a format in which each sample is one bit. PWM is used as the data format of SACD (Super Audio CD). The following describes how PWM stereo data would be packed and described in an XAF file.

XAFAudioFormat pwmDesc;
pwmDesc.mSampleRate=2822400.;
pwmDesc.mFormatID=kAudioFormatPWM; //'pwm'
pwmDesc.mFormatFlags=0;
pwmDesc.mChannelsPerFrame=2;
pwmDesc.mBitsPerChannel=1;
pwmDesc.mFramesPerPacket=8;
pwmDesc.mBytesPerPacket=2;

The sample rate for a SACD bit stream is 2.8224 MHz. There are no known flags required for PWM format at this time. This particular stream is 2 channels and there is 1 bit per channel. There are 8 frames per packet and, therefore, 2 bytes per packet (1 byte for each channel in the file). Thus, PWM is packed as follows (in binary): LLLLLLLL RRRRRRRR. That is, one byte represents 8 individual channel values, and the interleaving of each channel is done on the byte boundary (not on the individual sample or bit boundary).

Audio Data Chunk

In one embodiment, an XAF file contains one and only one audio data chunk (e.g., data chunk 102 of FIG. 1), which follows the audio data chunk's header (e.g., data chunk header 104 of FIG. 1).

In one embodiment, the data chunk is set up as:

```
struct XAFData
{
    UInt32   mEditCount;
    UInt8    mData[kVariableLengthArray];
};
``` where,
mEditCount is information that identifies the current version of the audio data, which is also referred to herein as "state information" for the audio;
mData is a variable length field that contains the audio data (e.g., audio data 106 of FIG. 1);

with an audio data chunk header as follows.
XAFChunkHeader dataChunkHeader;
dataChunkHeader.mChunkType='data';
dataChunkHeader.mChunkFlags=0;
dataChunkHeader.mChunkVersion=0;
dataChunkHeader.mChunkSize =−1;
//set: mEditCount=0;

Audio Data Size Parameter

A "−1" value for mChunkSize indicates that the audio data proceeds from this part of the file to the end of the file. When a file is finalized, this field is preferably updated to reflect the real size of the audio data chunk.

XAF allows an application to set the audio data chunk size field (e.g., audio data chunk size flag 108, for audio data 106, of FIG. 1) to "−1" and record without performing a file seek to update this size field. When the program finishes recording, then the program can update the sound data chunk size field, mChunkSize. A file whose sound data chunk size field is set to "−1" is well defined and should be able to be opened by any program that supports XAF files. A file in this state means that the audio data chunk is the last chunk in the file and the audio data extends from the beginning of that chunk to the end of the file. Hence, an application can easily find the position, within a stored file, of the end of the audio data, so that new chunks of non-audio metadata may be readily added to the file. If there are any other chunks after the audio data, then the mChunkSize must at all times be valid. When reading a file, if the mChunkSize is set to less than zero, then the reader should update this to the correct file size.

In one embodiment, an XAF file does not have the size of the file stored in its file header, like with AIFF or WAVE files. This information would be redundant since the size of the file can be obtained from the file system or the transport layer.

Figure 2:
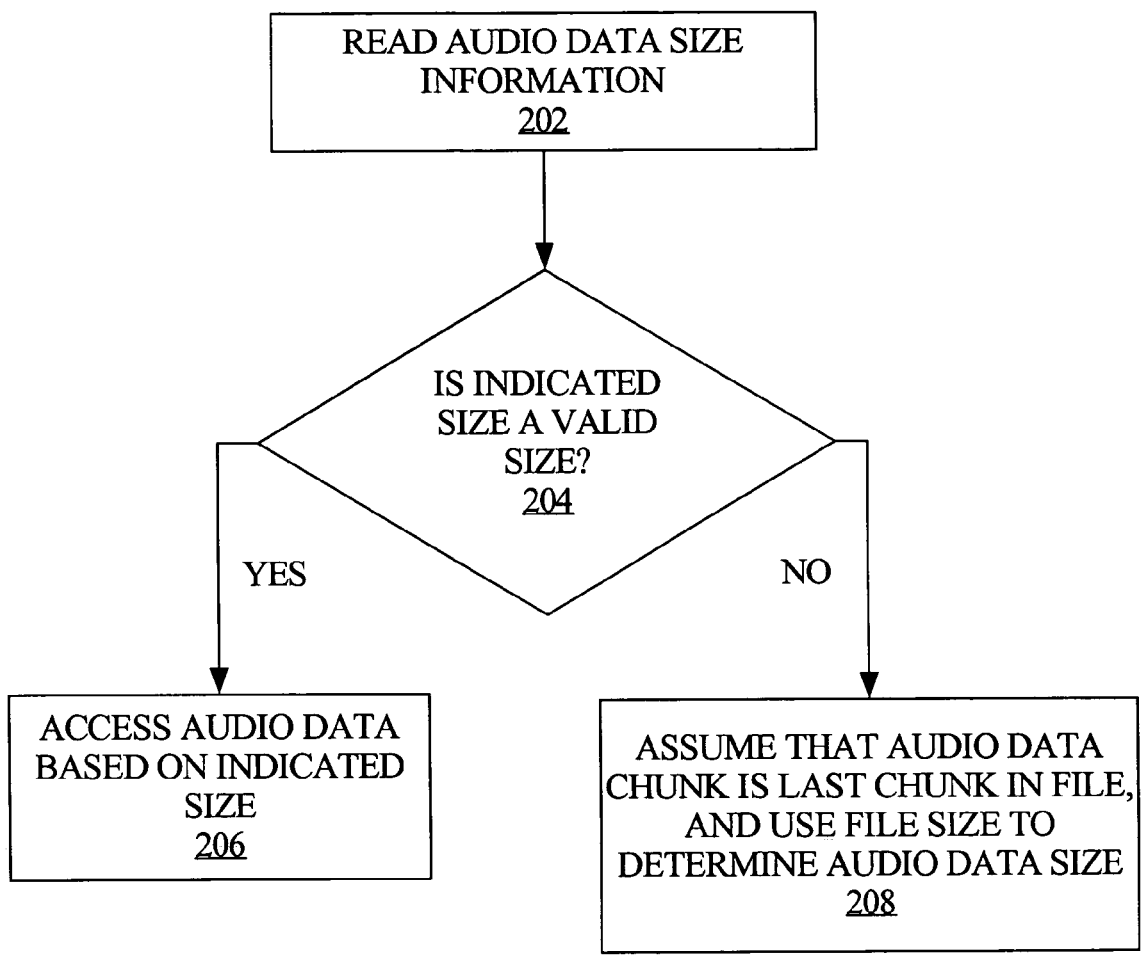
FIG. 2 is a flow diagram that illustrates a first method for handling audio information, according to an embodiment of the invention.

FIG. 2 is a flow diagram that illustrates a method for handling audio information, according to an embodiment of the invention.

At block 202, audio data size information is read. For example, the audio data chunk size flag 108 (FIG. 1), such as mChunkSize, is read from data chunk header 104 (FIG. 1), such as XAFChunkHeader, of data chunk 102 (FIG. 1).

At block 204, it is determined whether or not the size indicated in the size information is a valid size for audio data, such as audio data 106 (FIG. 1). If the indicated size is a valid size for audio data, then, at block 206, audio data is accessed based on the indicated size. For example, if the audio data chunk size flag 108 (FIG. 1) indicates a size greater than zero, then audio data 106 (FIG. 1) is read from data chunk 102 (FIG. 1). Otherwise, if the indicated size is not a valid size for audio data, then it is assumed that the audio data chunk is the last chunk in the audio file, and the entire audio file's size is used to determine the size of the audio data. For example, a value of "−1" is indicated in the audio data chunk size flag 108, which indicates an invalid size. Hence, the actual size of the audio data 106 can be determined based on a comparison between the size of the complete audio file 100 (FIG. 1) (e.g., from the operating system or a file system) and the starting point of the last chunk in the file, i.e., the audio chunk 102.

Editing and Cross-Chunk Dependencies

XAF files can contain chunks that have dependencies on a particular state of another chunk, typically the actual sound data stored within the data chunk. For example, overview data is generated based on the particular contents of the sound data. Thus, if the sound data were to change, that overview would be invalidated. To account for this situation, the data chunk has an mEditCount field (e.g., state information 110 of FIG. 1) that is incremented whenever a program edits the contents of the audio data chunk, to identify the current state (or version) of the audio data. In one embodiment, chunks that have dependencies on a particular state of the data chunk also have an mEditCount field (e.g., dependency indicator 124 of FIG. 1), which is set to the value of the mEditCount field of the data chunk at the time that the dependent chunk is generated and, therefore, identifies the state (or version) of the audio data from which the dependent chunk is derived.

The mEditCount field is initially set to zero when creating a new file. Any time the contents of the data chunk are edited in any way, the field must be incremented by the editing program. More details of this functionality are described herein in reference to the overview chunk and the peak chunk.

In one embodiment, chunk fields that have dependencies on a particular state of the data chunk also have an mEditCount field, which is set to the value of the mEditCount field of the data chunk at the time that the dependent field is populated and, therefore, identifies the state (or version) of the audio data from which the dependent field is derived.

Figure 3:
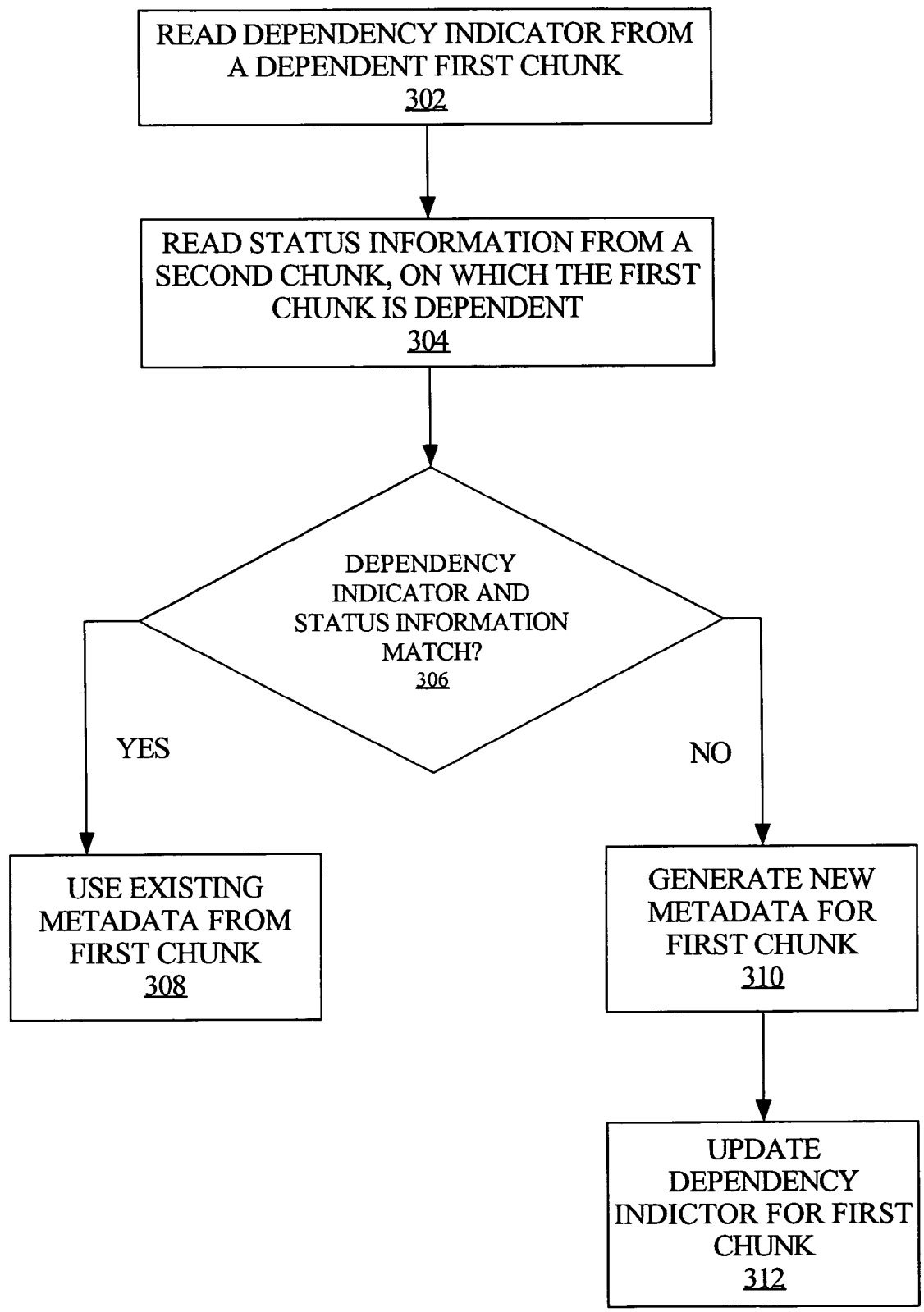
FIG. 3 is a flow diagram that illustrates a second method for handling audio information, according to an embodiment of the invention.

FIG. 3 is a flow diagram that illustrates a method for handling audio information, according to an embodiment of the invention.

At block 302, a dependency indicator is read from a chunk (referred to as "first chunk", without implying that it is actually the first chunk in the audio file) from an audio file, where the chunk contains information that is dependent on another chunk in the audio file. For example, where derived statistics 126 (FIG. 1) from an overview chunk 122 (FIG. 1) are dependent on, or derived from, audio data 106 (FIG. 1) of audio chunk 102 (FIG. 1), the dependency indicator 124 (FIG. 1) (e.g., mEditCount) is read from the overview chunk 122. In this example, dependency indicator 122 indicates from what version of audio data 106 the derived statistics 126 were derived. In general, a dependency indicator for a given chunk, or for a given parameter within a chunk, matches with state information associated with the version of information on which the given chunk or parameter is dependent.

At block 304, state information is read from a chunk (referred to as "second chunk", without implying that it is actually the second chunk in the audio file) on which the other chunk (first chunk) is dependent. For example, the current state information 110 (FIG. 1) in data chunk 102 (FIG. 1) is read, which indicates the current version of audio data 106 (FIG. 1). Thus, at decision block 306, it is determined whether the dependency indicator and the status information match. For example, it is determined whether or not the mEditCount for the first chunk, which is associated with at least some information in the first chunk, is the same as the current mEditCount for the second chunk, the chunk on which the information in the first chunk depends.

If the dependency indicator and the state information match, then that means that the information in the second chunk, on which the information in the first chunk depends, has not been changed since the information in the first chunk was generated. For example, the audio data 106 (FIG. 1) from which the derived statistics 126 (FIG. 1) were generated has not changed since the derived statistics 126 were generated and, therefore, the derived statistics are still valid and consistent with the audio data 106. Thus, at block 308, the existing metadata from the first chunk, or whatever information in the first chunk is dependent on the second chunk, is used.

If the dependency indicator and the state information do not match, then that means that the information in the second chunk, on which the information in the first chunk depends, has been changed since the information in the first chunk was generated. For example, the audio data 106 (FIG. 1) from which the derived statistics 126 (FIG. 1) were generated has changed since the derived statistics 126 were generated and, therefore, the derived statistics may no longer be valid and may be inconsistent with the audio data 106. Thus, at block 310, new metadata is generated for the first chunk, or whatever information in the first chunk is dependent on the second chunk. For example, the derived statistics 126 are regenerated or updated to reflect the current state of the audio data 106, which is associated with the current state information 110 (FIG. 1).

In addition, the dependency indicator is updated to reflect the new metadata generated for the first chunk, at block 312. For example, the dependency indicator 124 (FIG. 1) (e.g., mEditCount) that is associated with the derived statistics 126 is updated to reflect the current state information 110 (e.g., mEditCount) that is associated with audio data 106, thereby indicating that the current derived statistics 126 are again valid and consistent with the information on which the statistics depend, i.e., the audio data 106.

Packet Table Chunk

The Packet Table chunk (e.g., packet table chunk 132 of FIG. 1) expresses the characteristics of the encoded bit stream, i.e., the audio stream's (1) duration in sample frames, (2) any additional priming (what could be considered as latency), and (3) remainder frames (any padding that was performed in the encoding process to flush the last partial frames per packet samples). The packet table chunk is needed for VBR formats, in which the presence of a packet table chunk is determined by the mBytesPerPacket field of the format chunk being zero.

In one embodiment, a Packet Table chunk is structured as follows.

```
struct XAFPacketTableHeader
{
    SInt64    mNumberPackets;
    SInt32    mPrimingFrames;
    SInt32    mRemainderFrames;
};
``` where,
  mNumberPackets is the total number of packets of audio data contained in the file;
  mPrimingFrames is the number of frames that a packetized stream uses as priming and/or processing latency;
  mRemainderFrames is the number of frames that are left over from the last packet. For example, an AAC bit stream may only have 313 frames that are valid in its last packet. The frames per packet is 1024, so in this case, mRemainderFrames is (1024-313), which represents that number of samples that should be trimmed from the output of the last packet when decoding.

If an encoded bit stream is being edited, then it is recommended that the packets preceding the edit point that would account for at least mPrimingFrames be taken with the edit to ensure a perfect reproduction of the audio from the edit point. Of course, when random accessing different packets in a file for playback, the mPrimingFrames should be used to reconstruct the audio at the desired point.

In one embodiment, values in the packet descriptions use variable length encoded integers. Each byte contains 7 bits of size information, if the top bit is set (i.e., the byte's value is >=128), then the next byte in the stream contains the continuation of the size. The overall size is determined by finding a byte that has a value <127.

For example,

| Value | Representation | | |
|---|---|---|---|
| 1 | 1 | (0x01) | 1 Byte |
| 127 | 127 | (0x7F) | 1 Byte |
| 128 | 1 128 | (0x01 0x80) | 2 Bytes |
| 129 | 1 129 | (0x01 0x81) | 2 Bytes |
| etc. | | | |

In one embodiment, the edit count semantic that is described in reference to some of the other chunks (e.g., overview chunk, peak chunk), is not applicable with the packet table chunk as its state must always be synchronized with any edits performed on the audio data.

Use with a Constant Bit Rate Format

In one embodiment, a packet chunk is present even with a constant bit rate (constant frames per packet and constant bytes per packet) format to express one of two possible pieces of information: (1) any latency (mPrimingFrames) due to the nature of the codec; (2) any remainder frames, where the source material does not conform to the frames per packet boundary of the codec. In this usage, mNumberPackets should be set to zero, and should be ignored by the parser. For example, IMA encodes samples into packet of 64 sample frames per packet. If the source material was not equally divisible by 64 frames, then the last packet of IMA content will decode to less samples than the 64 that are presented by the packet. Thus, an XAF file of IMA content could have a packet table where the last packet only has 5 valid samples, as follows:

```
mIMAPacketTable.mNumberPackets = 0; // set to zero,
ignored for codecs where the desc's mBytesPerPacket != 0
    mIMAPacketTable.mPrimingFrames = 0; //IMA has no latency
    mIMAPacketTable.mRemainderFrames = 59; // 64 (frames
per packet) – 5
```

This chunk's size in this case will be 16 as there are no packet descriptions in a format of this type. This is an optional chunk for this type of format.

Use with a Constant Frames Per Packet Format

In one embodiment, the packet chunk is present when bytes per packet is zero and frames per packet is non-zero. The packet descriptions contain one variable length integer to describe the number of bytes each packet contains.

For example, given audio data encoded into AAC source of 3074 sample frames, at 44.1 KHz (stereo), the format for is described as 1024 frames per packet and 0 bytes per packet. The data chunk will contain 6 AAC packets end to end, and the packet table chunk is as follows.

XAFChunkHeader packetChunkHeader;
  dataChunkHeader.mChunkType='pakt';
  dataChunkHeader.mChunkFlags=0;
  dataChunkHeader.mChunkVersion=0;
  dataChunkHeader.mChunkSize=calc_sizeOfThePacket Table;
  XAFPacketTableHeader packetTable;
  packetTable.mNumberPackets=5;
  packetTable.mPrimingFrames=2112;
  packetTable.mRemainderFrames=958;

Following this would be 5 variable sized integers that describe the number of bytes for each of the 5 packets. The total calc_sizeOfThePacketTable would at least be the number of bytes used to encode the packet sizes plus 16 (sizeof (XAFPacketTableHeader)). In this scenario, the following relationship of packets to its encoded/decoded frames is:

| Packet: | 1 | 2 | 3 | 4 | 5 | 6 |
|---|---|---|---|---|---|---|
| Valid Frames: | 0 | 0 | 960 | 1024 | 1024 | 66 |

Use with a Variable Frames Per Packet Format

In one embodiment (determined by the fact that the description has a value of zero for both the frames per packet and bytes per packet entries), the packet descriptions contain two value for each packet (both encoded as a Variable Length Integer): (1) the number of frames contained within the packet; and (2) the size of the packet in bytes.

Some audio codecs (such as Main Profile AAC in MPEG-2, or AAC Long Term Prediction object in MPEG-4) use samples from both the preceding and the following range that is going to be encoded in a particular encoded packet. However, once encoded, there is no dependency in these packets for any data following the current packet, though there are dependencies on preceding packets, which is what the mPrimingFrames depicts.

If the audio format does not have a forward dependency in its encoded bit-stream, in one embodiment, the packet table chunk does not contain a field to depict such a dependency. If a format does have a forward dependency in its encoded bit-stream, in one embodiment, the packet table chunk can be used to account for that.

Channel Descriptions Chunk

A channel descriptions chunk (e.g., channel descriptions chunk 112 of FIG. 1) contains a set of audio channel descriptions, which, in one embodiment, specify both the order and the location (i.e., the role or usage) of each of the channels that are contained within the file. In one embodiment, the structure of a channel descriptions chunk is as follows.

```
mChunkType = 'chan'
struct AudioChannelDescription
{
    AudioChannelLabel   mChannelLabel;
    UInt32              mChannelFlags;
    Float32             mCoordinates[3];
};
```

The number of channel descriptions contained in the channel descriptions chunk is the same as the number of channels specified in the format chunk. The order of the channel descriptions describes the matched channel of audio data. That is, the first channel description describes the first channel, the second channel description describes the second channel, and so on. The channel labels, coordinate specifications and flags are provided hereafter.

An XAF file with no channel descriptions can be interpreted as:

1 Channel—Mono
2 Channel—Stereo
>2 Channels—No implicit information is known about the channels or their intended usage.

It is a common practice to split multi-channel mixes into a collection of single channel files. In such a scenario, it is recommended that each of these split (and, thus, inter-dependent) files contains a channel description that describes the intended use of that file's channel. For example, instead of a single stereo file, there are two files: one for the left channel and one for the right channel. The left channel file has a single channel description that labels the channel as a left channel, and the right channel file has a single channel description that labels the channel as the right channel. This avoids the fragile but common practice of including this channel information solely in the name of the file.

In one embodiment, channel labels only describe the channel's label (left, right, etc). The location of a channel based on a label is inferred from the standard location of that channel when so specified. For example, the description can also specify a location, in addition to the channel label. This location can be the expected location for that label, or a customized location appropriate for a given file's channel.

By specifying a label, parsing software can derive what generic channel layout is being presented by a file. For example, a 6 channel file that has labels indicating left, right, left surround, right surround, center and LFE can be presented as a file containing 5.1 content. Commonly-used channel layouts with their known channel constituents are presented hereafter.

An Information chunk, described hereafter, also supplies a key for a user presentable name that represents the channel layout contained within the file.

Channel description definitions that may be used to identify channels, channel coordinate that may be used to specify the location that respective channels are to be presented, and common channel layouts are described hereafter under the heading of "Miscellaneous Description."

Optional Chunks

The following chunks are optional chunks in that they do not appear in all XAF files.
Free Chunk
mChunkType='free'
This is a padding chunk for reserving space in the file. The content of the Free chunk is meaningless.
Magic Cookie Chunk
mChunkType='kuki'
A magic cookie chunk contains private data required by the format contained in the file. Wherever possible, a magic cookie's structure is defined by the format it describes. By defining and providing standards-compliant "kuki's", other code that parses and plays these files are less likely to fail. Thus, for the following formats, where present, the Magic Cookie is defined as:

MP3—no magic cookie (as it is not required by the data stream);
AAC—the ESDS as defined as codec specific data in the MPEG-4 definition.

As with the layout of the packetized data formats, the body or company that owns or administers the audio format is also required to describe the format of the magic cookie (and even if it is needed), for that format. Furthermore, if a format is a proprietary format, then that format's owner should describe the magic cookie format and is also responsible for any data versioning required of the magic cookie's contents, i.e., the chunk header's version field is not to be used to version different data formats of the data contained within a magic cookie.

Marker Chunk

XAF format provides a rich marker format (that is also used to define Regions), which provides efficient and robust recording and editing capabilities. Markers include SMPTE time stamps, as well as extensible flags that can be used for containing information used when mastering. In one embodiment, a Marker chunk is structured as follows.

```
mChunkType = 'mark'
// SMPTE Time Types
enum
{
    kXAF_SMPTE_TimeType24     = 1,
    kXAF_SMPTE_TimeType25     = 2,
    kXAF_SMPTE_TimeType30Drop = 3,
    kXAF_SMPTE_TimeType30     = 4,
    kXAF_SMPTE_TimeType2997   = 5,
    kXAF_SMPTE_TimeType2997Drop = 6,
    kXAF_SMPTE_TimeType60     = 7,
    kXAF_SMPTE_TimeType5994   = 8
};
struct XAF_SMPTE_Time
{
    UInt8    mHours;
    UInt8    mMinutes;
    UInt8    mSeconds;
    UInt8    mFrames;
    UInt32   mSubFrameSampleOffset;
};
typedef struct XAF_SMPTE_Time XAF_SMPTE_Time;
struct XAFMarker
{
```

-continued
```
    UInt32      mMarkerSize;        // length in bytes of the marker.
    UInt32      mType;
    Float64     mFramePosition;
    SInt32      mMarkerID;
    XAF_SMPTE_Time   mSMPTETime;
    UInt16      mChannel;
    UInt16      mReserved;
    UInt8       mName[kVariableLengthArray]; // null
    terminated UTF8 string
};
typedef struct XAFMarker XAFMarker;
// marker types
// markers
```

The following is an exemplary, non-exhaustive and non-limiting list of values for different marker types.

```
enum {
    kXAFMarkerType_Generic          = 0,
    kXAFMarkerType_ProgramStart     = 'pbeg',
    kXAFMarkerType_ProgramEnd       = 'pend',
    kXAFMarkerType_TrackStart       = 'tbeg',
    kXAFMarkerType_TrackEnd         = 'tend',
    kXAFMarkerType_Index            = 'indx',
    kXAFMarkerType_RegionStart      = 'rbeg',
    kXAFMarkerType_RegionEnd        = 'rend',
    kXAFMarkerType_RegionSyncPoint  = 'rsyc',
    kXAFMarkerType_SelectionStart   = 'sbeg',
    kXAFMarkerType_SelectionEnd     = 'send',
    kXAFMarkerType_EditSourceBegin  = 'cbeg',
    kXAFMarkerType_EditSourceEnd    = 'cend',
    kXAFMarkerType_EditDestinationBegin = 'dbeg',
    kXAFMarkerType_EditDestinationEnd   = 'dend',
    kXAFMarkerType_SustainLoopStart = 'slbg',
    kXAFMarkerType_SustainLoopEnd   = 'slen',
    kXAFMarkerType_ReleaseLoopStart = 'rlbg',
    kXAFMarkerType_ReleaseLoopEnd   = 'rlen'
};
struct XAFMarkerChunk
{
    UInt32      mSMPTE_TimeType;
    UInt32      mNumberMarkers;
    XAFMarker   mMarkers[kVariableLengthArray];
}
typedef struct XAFMarkerChunk XAFMarkerChunk.
```

If the SMPTE time of a particular marker is not valid (i.e., not set), then all of the bytes used in the SMPTE Time for that marker should be set to "0xFF", which is herein an invalid SMPTE time. If the mSMPTE_TimeType is zero, then no markers will contain valid SMPTE times (i.e., all SMPTE Times must be marked invalid). If mSMPTE_TimeType is non-zero, then this field indicates the frame rate axis of any valid SMPTE times contained in a given marker. However, in such a scenario, a marker may still contain an invalid SMPTE time.

The mSubFrameSampleOffset field is provided so that SMPTE correlations for sample locations can be done sub-frame (and sample-accurately sub-frame). It is a sample offset to the HH:MM:SS:FF time stamp.

Region Chunk

```
mChunkType = 'regn'
struct XAFRegion
{
    UInt32      mNumberMarkers;
    XAFMarker   mMarkers[kVariableLengthArray];
};
```

-continued
```
typedef struct XAFRegion XAFRegion;
struct XAFRegionChunk
{
    UInt32      mSMPTE_TimeType;
    UInt32      mNumberRegions;
    XAFRegion   mRegions[kVariableLengthArray];
}
typedef struct XAFRegionChunk XAFRegionChunk.
```

The meaning and interpretation of the mSMPTE_TimeType field is the same as described for the marker chunk.

Overview Chunk

In XAF files, audio overview metadata (e.g., statistics regarding samples of the audio data, such as maximum amplitude and minimum amplitude) are stored in an Overview chunk (e.g., derived statistics 126 in overview chunk 122 of FIG. 1) within the same file as the actual audio data. In one embodiment, the structure of the Overview chunk is as follows.

```
mChunkType = 'ovvw'
struct XAFOverviewSample
{
    SInt16      mMinValue;
    SInt16      mMaxValue;
};
struct XAFOverview
{
    UInt32              mEditCount;
    UInt32              mNumFramesPerOVWSample;
    XAFOverviewSample   mData[kVariableLengthArray];
};
typedef struct XAFOverview XAFOverview;
``` where
mNumFramesPerOVWSample describes the number of frames of audio data that are represented by a single OVW sample;
mData—data in each byte of the Overview Sample is a big-endian signed 16 bit integer. There are two data points per sample, a minimum and maximum amplitude.

An overview chunk's header includes a UInt32 sized field mEditCount. When an overview chunk is created, the mEditCount field (e.g., the dependency indicator 124 of FIG. 1) should be set to the current value of the edit count field of the data chunk used to create the overview. Consequently, a program can then validate whether an overview is still valid by comparing the value of an overview's edit count with the current value of the data chunk's edit count. If they don't match, then the overview should be considered to be invalid, and regenerated. There can be multiple overview data chunks that may include the same statistics at different resolutions.

MIDI Chunk mChunkType='midi'

The contents of a MIDI chunk is a standard MIDI file. A MIDI chunk can be used to express meta-information about the audio data, for example, tempo information, key signatures, time signature, MIDI equivalence to the audio data, etc.

Peak Chunk

```
mChunkType = 'peak'
struct XAFPositionPeak
{
```

-continued

```
    Float32   mValue;
    UInt64    mFrameNumber;
};
```

The peak chunk gives the signed maximum absolute amplitude normalized to a floating point range in the interval [−1.0, +1.0], and gives the frame in the file where that peak occurs. Integer values should be scaled by the appropriate power of two to the interval [−1.0, +1.0). For example, the maximum positive 16 bit value is (32767.0/32768.0). The mValue field is conformant to the IEEE-754 specification.

The size of a peak chunk's data is:

mChunkSize=sizeof(XAFPositionPeak)* numChannelsInFile+sizeof (UInt32).

The sizeof(UInt32) here is for the mEditCount field. Thus, for a 2 channel file, the peak chunk will look like this:

```
    mChunkSize = 26; //12 * 2 + 4
    mEditCount = //edit count of data chunk
    myPeakData.mValue[0] = // maximum dBFS value of channel 0
    myPeakData.mFrameNumber[0] = // sample frame location of this
maximum value for channel 0
    myPeakData.mValue[1] = // maximum dBFS value of channel 1
    myPeakData.mFrameNumber[1] = // sample frame location of this
maximum value for channel 1.
```

As with the overview chunk, the edit count field of this chunk should be set to the value of the data chunk's mEditCount field when the peak chunk is created. There should be only one peak chunk in the file. If the edit count of the peak chunk does not match the edit count of the audio data chunk, then the peak chunk's data should be considered invalid, and thus regenerated. The flags and version fields should be set to zero in this specification.

UMID Chunk mChunkType='umid'

The Unique Material Identifier is defined by the SMPTE organization (SMPTE 330M-2000) and is used within the broadcast and other industries to uniquely identify material contained within a file or collection of files. The Size of a UMID chunk is 64 bytes. There can be only one UMID chunk within a file. If a 32 byte basic UMID is used, the following 32 bytes should be set to zero. It is expected that the guidelines published by the European Broadcast Union (EBU) for the use of UMID's with audio content are adhered to in XAF file usage.

Information Chunk

```
mChunkType = 'info'
struct XAFStringsChunk
{
    UInt32    mNumEntries;
// struct {
//   UInt8  mKey[kVariableLengthArray];   // null terminated UTF8 string
//   UInt8  mValue[kVariableLengthArray]; // null terminated UTF8
string
// } mStrings[kVariableLengthArray];    // variable length
};
```

The information chunk can contain any number of string key-value pairs, where the key-value pairs themselves are fairly arbitrary. The mChunkSize size of an information chunk is the number of bytes occupied by the key-value strings and the 4 bytes for the mNumEntries field.

Information in the information chunk may also occur in other chunks within an XAF file. In such a scenario, the other chunks take precedence over the information chunk. For example, a file may contain both an entry for key signature and tempo in the information chunk, but also contain a MIDI chunk with both key and tempo MIDI events. If there is a conflict, then the information contained in the MIDI chunk takes precedence over the information in the information chunk.

The following is an exemplary, non-exhaustive and non-limiting list of values for information keys.

base note is the base note (if applicable) of the audio data. This string contains a MIDI note number and can be fractional to handle "out of tune" samples (e.g. "60.12" is twelve cents above middle C). The '.' character must be used as the separator between note number and its fractional part.

tempo is the base tempo of the audio data in beats per minute.

key signature—e.g., "C", "Cm", "C#", "Cb". The note is captialized with values from A to G, 'm' is for minor, 'b' is for flat, '#' is for sharp.

time signature—e.g., "4/4", "6/8".

artist identifies the artist/creator of the audio.

album identifies the title of the album/musical collection, if any.

track number is the number of the track of the album/musical collection.

year is the year that the album/musical collection was made.

composer identifies the composer of the audio, if any.

lyricist identifies the lyricist, if any.

genre identifies the genre of audio, if applicable.

title is the nominal title or name of the contained song/loop/sample etc. The title can be different from the file name.

recorded time—a time of day string.

comments — copyright is a copyright string, e.g., "2004 The CoolBandName. All Rights Reserved".

source encoder—e.g., "My AAC Encoder, v4.2".

encoding application—e.g., "My App, v1.0".

nominal bit rate—e.g., "128 kbits".

channel layout—e.g., "stereo", "5.1 Surround", "10.2 Surround", etc.

In one embodiment, the presenting code can be implemented to prepend the string "Copyright ©" to the copyright key rather than including this in the value of the copyright key.

Placing a '.' character as the first character of a key means that the key-value pair is generally not to be displayed. This allows different applications to store private information that should be preserved by other programs, without displaying data to a user that is potentially meaningless or confusing.

Edit Comments Chunk mChunkType='edct'

This chunk is for timestamped, human readable comments that coincide with edits to the data contained within an XAF file. The contents of this chunk use the same layout as the 'info' chunk (i.e., a UInt32 mNumEntries, and a pair of key-value pairs). However, in an Edit Comments chunk, the keys are time of day strings, and a comment that can summarize the edits made. Any time of day timestamps contained within an XAF file are of the format defined by the ISO-8601 specification. Details of how this format is described hereafter.

Extensibility and UUID Chunk mChunkType='uuid'

This chunk type is used to provide a guaranteed unique identifier for customized chunks, which is based on the ISO 14496-1 specification for UUID identifiers. In one embodiment, the UUID chunk is structured as follows.

```
struct XAF_UUID_ChunkHeader
{
   XAFChunkHeader mHeader;
   UInt8    mUUID[16];
};
XAF_UUID_ChunkHeader uuidChunkHeader;
uuidChunkHeader.mHeader.mChunkType = 'uuid';
uuidChunkHeader.mHeader.mChunkFlags = 0;
uuidChunkHeader.mHeader.mChunkVersion = 0;
uuidChunkHeader.mHeader.mChunkSize = <size of chunk including UUID>;
memcpy (uuidChunkHeader.mUUID, generatedUUID, 16).
```

Any data following the UUID chunk header is defined by that UUID. The mChunkSize of the UUID chunk must include the size of the generated 16 byte UUID. If the UUID chunk has dependencies on the edit count of the data chunk, then that should be stored after the mUUID field.

For some chunks, such as Markers, Regions, and Information, it is possible for the chunk's actual data size to be bigger than its current valid contents. This allows files to be created with some headroom within the actual data segment of a chunk to add additional content. These types of chunks contain a specifier for the number of valid entries and, when parsing, this specifier should be the primary target used to return valid data.

Miscellaneous Description

Time of Day Data Format (ISO-8601)

```
YYYY =   four-digit year
MM =     two-digit month (01 = January, etc.)
DD =     two-digit day of month (01 through 31)
'T' =    separator between date and time fragments
hh =     two digits of hour (00 through 23) (am/pm NOT allowed)
mm =     two digits of minute (00 through 59)
ss =     two digits of second (00 through 59)
```

Some example formats are as follows:

Year:
  YYYY (eg 1997)

Year and month:
  YYYY-MM (eg 1997-07)

Complete date:
  YYYY-MM-DD (eg 1997-07-16)

Complete date plus hours, minutes and seconds:
  YYYY-MM-DDThh:mm:ss (eg 1997-07-16T19:20:30)

As per this standard's definition, fractional seconds are not described in any XAF usage of this structure. ALL times are described based on UTC (Coordinated Universal Time).

Channel Description Definitions

The following channel labels are used to identify channels, according to one embodiment.

```
enum
{
    kAudioChannelLabel_Unknown         = 0xFFFFFFFF, // unknown or unspecified other use
    kAudioChannelLabel_Unused          = 0,          // channel is present, but has no intended use or destination
    kAudioChannelLabel_UseCoordinates  = 100,        // channel is described solely by the mCoordinates fields.
    kAudioChannelLabel_Left            = 1,
    kAudioChannelLabel_Right           = 2,
    kAudioChannelLabel_Center          = 3,
    kAudioChannelLabel_LFEScreen       = 4,
    kAudioChannelLabel_LeftSurround    = 5,          // WAVE: "Back Left"
    kAudioChannelLabel_RightSurround   = 6,          // WAVE: "Back Right"
    kAudioChannelLabel_LeftCenter      = 7,
    kAudioChannelLabel_RightCenter     = 8,
    kAudioChannelLabel_CenterSurround  = 9,          // WAVE: "Back Center" or plain "Rear Surround"
    kAudioChannelLabel_LeftSurroundDirect  = 10,     // WAVE: "Side Left"
    kAudioChannelLabel_RightSurroundDirect = 11,     // WAVE: "Side Right"
    kAudioChannelLabel_TopCenterSurround   = 12,
    kAudioChannelLabel_VerticalHeightLeft  = 13,     // WAVE: "Top Front Left"
    kAudioChannelLabel_VerticalHeightCenter = 14,    // WAVE: "Top Front Center"
    kAudioChannelLabel_VerticalHeightRight = 15,     // WAVE: "Top Front Right"
    kAudioChannelLabel_TopBackLeft     = 16,
    kAudioChannelLabel_TopBackCenter   = 17,
    kAudioChannelLabel_TopBackRight    = 18,
    kAudioChannelLabel_RearSurroundLeft  = 33,
    kAudioChannelLabel_RearSurroundRight = 34,
    kAudioChannelLabel_LeftWide        = 35,
    kAudioChannelLabel_RightWide       = 36,
    kAudioChannelLabel_LFE2            = 37,
    kAudioChannelLabel_LeftTotal       = 38,         // matrix encoded 4 channels
    kAudioChannelLabel_RightTotal      = 39,         // matrix encoded 4 channels
    kAudioChannelLabel_HearingImpaired = 40,
```

```
        kAudioChannelLabel_Narration          = 41,
        kAudioChannelLabel_Mono               = 42,
        kAudioChannelLabel_DialogCentricMix   = 43,
        kAudioChannelLabel_CenterSurroundDirect  = 44,    // back center, non diffuse
        // first order ambisonic channels
        kAudioChannelLabel_Ambisonic_W        = 200,
        kAudioChannelLabel_Ambisonic_X        = 201,
        kAudioChannelLabel_Ambisonic_Y        = 202,
        kAudioChannelLabel_Ambisonic_Z        = 203,
        // Mid/Side Recording
        kAudioChannelLabel_MS_Mid             = 204,
        kAudioChannelLabel_MS_Side            = 205,
        // X-Y Recording
        kAudioChannelLabel_XY_X               = 206,
        kAudioChannelLabel_XY_Y               = 207,
        // other
        kAudioChannelLabel_HeadphonesLeft     = 301,
        kAudioChannelLabel_HeadphonesRight    = 302,
        kAudioChannelLabel_ClickTrack         = 304,
        kAudioChannelLabel_ForeignLanguage    = 305
    };
```

The following constants are used in the mChannelFlags field.

```
    enum
    {
        kAudioChannelFlags_RectangularCoordinates = (1L<<0),
        kAudioChannelFlags_SphericalCoordinates = (1L<<1),
        kAudioChannelFlags_Meters = (1L<<2)
    };
``` kAudioChannelFlags_RectangularCoordinates—The channel is specified by the cartesian coordinates of the speaker position. This flag is mutally exclusive with kAudioChannelFlags_SphericalCoordinates.

kAudioChannelFlags_SphericalCoordinates—The channel is specified by the spherical coordinates of the speaker position. This flag is mutally exclusive with kAAudioChannelFlags_RectangularCoordinates.

kAudioChannelFlags_Meters—Set to indicate the units are in meters, clear to indicate the units are relative to the unit cube or unit sphere.

If the channel description provides no coordinate information, then the mChannelFlags field is set to zero.

Channel Coordinates
(A) Rectangular Coordinates:
  Negative is left and positive is right.
  Negative is back and positive is front.
  Negative is below ground level, 0 is ground level, and positive is above ground level.
(B) Spherical Coordinates:
  0 is front center, positive is right, negative is left. This is measured in degrees.
  +90 is zenith, 0 is horizontal, −90 is nadir. This is measured in degrees.

Common Channel Layouts

The following is an exemplary, non-exhaustive and non-limiting list of values for some common channel layouts. Abbreviations used are:
  L—left
  R—right
  C—center
  Ls—left surround
  Rs—right surround
  Cs—center surround
  Lrs—left rear surround
  Rrs—right rear surround
  Lw—left wide
  Rw—right wide
  Lsd—left surround direct
  Rsd—right surround direct
  Lc—left center
  Rc—right center
  Ts—top surround
  Vhl—vertical height left
  Vhc—vertical height center
  Vhr—vertical height right
  Lt—left matrix total. for matrix encoded stereo.
  Rt—right matrix total. for matrix encoded stereo.

In the following descriptions, ordering of the channels for a given layout is not implied. For example, while 5.1 is described as L, R, Ls, Rs, C, LFE, a file can contain these channels in any order. The order of the channel descriptions in the Channel Descriptions chunk of a file determines the order in which the channels contained in that particular file are presented.

2 Channel Files
  Stereo—a standard stereo stream (L R)—implied playback;
  StereoHeadphones—a standard stereo stream (L R)—implied headphone playback;
  MatrixStereo—a matrix encoded stereo stream (Lt, Rt);
  MidSide—mid/side recording;
  XY—coincident mic pair (often 2 figure 8's);
  Binaural—binaural stereo (left, right).
3 Channel Files
  MPEG3.0—L,R,C;
  ITU 2.1—L, R, LFE.
4 Channel Files
  Quadraphonic—front left, front right, back left, back right;
  Ambisonic_B_Format—W, X, Y, Z;
  MPEG4.0—L,R,C,Cs.
5 Channel Files
  Pentagonal—left, right, rear left, rear right, center;
  MPEG 5.0—L, R, Ls, Rs, C.
6 Channel Files
  Hexagonal—left, right, rear left, rear right, center, rear;
  MPEG 5.1—L, R, Ls, Rs, C, LFE;

MPEG 6.0—L, R, Ls, Rs, C, Cs.

7 Channel Files

MPEG 6.1—L, R, Ls, Rs, C, Cs, LFE;

MPEG 7.0—L, R, Ls, Rs, C, Lrs, Rrs;

MPEG 7.0 (B)—L, R, Ls, Rs, C, Lc, Rc.

8 Channel Files

Octagonal—front left, front right, rear left, rear right, front center, rear center, side left, side right;

Cube—left, right, rear left, rear right, top left, top right, top rear left, top rear right;

MPEG 7.1—L, R, Ls, Rs, C, Lrs, Rrs, LFE;

MPEG 7.0 (B)—L, R, Ls, Rs, C, Lc, Rc, LFE;

SMPTE_DTV—L, R, C, LFE, Ls, Rs, Lt, Rt (MPEG 5.1 plus a matrix encoded stereo mix).

16 Channel Files

TMH 10.2 Standard—L, R, C, Vhc, Lsd, Rsd, Ls, Rs, Vhl, Vhr, Lw, Rw, Csd, Cs, LFE1, LFE2

21 Channel Files

TMH 10.2 Full—(TMH 10.2 Standard plus) Lc, Rc, HI, VI, Haptic.

Hardware Overview

Figure 4:
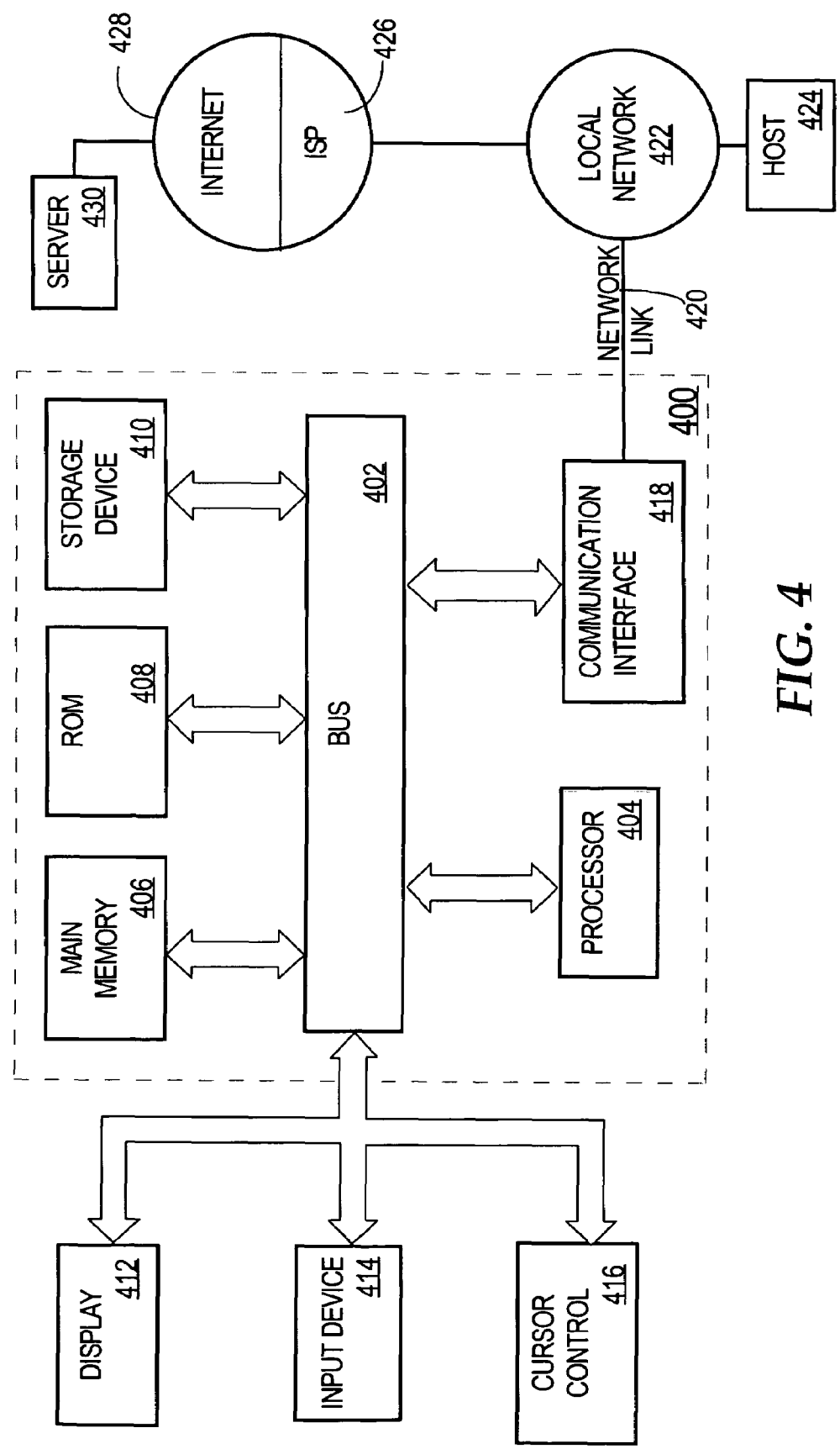
FIG. 4 is a block diagram that illustrates a computer system upon which an embodiment of the invention may be implemented.

FIG. 4 is a block diagram that illustrates a computer system 400 upon which an embodiment of the invention may be implemented. A computer system as illustrated in FIG. 4 is but one possible system on which embodiments of the invention may be implemented and practiced. For example, embodiments of the invention may be implemented on any suitably configured device, such as a handheld or otherwise portable device, a desktop device, a set-top device, a networked device, and the like, configured for recording, processing or playing audio files. Hence, all of the components that are illustrated and described in reference to FIG. 4 are not necessary for implementing embodiments of the invention.

Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk, optical disk, or magneto-optical disk, is provided and coupled to bus 402 for storing information and instructions.

Computer system 400 may be coupled via bus 402 to a display 412, such as a cathode ray tube (CRT) or a liquid crystal display (LCD), for displaying information to a system user. In the context of computer system 400 as an audio recording and playback system, computer system 400 may be coupled to an audio output device, such as speakers or a headphone jack, for playing audio to a system user. An input device 414, including alphanumeric and other keys, is coupled to bus 402 for communicating information and command selections to processor 404. Another type of user input device is cursor control 416, such as a mouse, a trackball, a stylus or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical, magnetic, or magneto-optical disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

EXTENSIONS AND ALTERNATIVES

Alternative embodiments of the invention are described throughout the foregoing description, and in locations that best facilitate understanding the context of the embodiments. Furthermore, the invention has been described with reference to specific embodiments thereof. It will, however, be evident that various modifications and changes may be made thereto without departing from the broader spirit and scope of the invention. Therefore, the specification and drawings are, accordingly, to be regarded in an illustrative rather than a restrictive sense.

In addition, in this description certain process steps are set forth in a particular order, and alphabetic and alphanumeric labels may be used to identify certain steps. Unless specifically stated in the description, embodiments of the invention are not necessarily limited to any particular order of carrying out such steps. In particular, the labels are used merely for convenient identification of steps, and are not intended to specify or require a particular order of carrying out such steps.

What is claimed is:

1. A method for handling audio information, comprising:
storing a set of chunks in a single audio file, wherein said set of chunks includes an audio data chunk and a plurality of metadata chunks;
wherein each chunk of said set of chunks includes metadata indicating a chunk size;
storing, as part of said single audio file, a flag that initially is in a first state to indicate that a last chunk in said single audio file is said audio data chunk that contains audio data;
while parsing said single audio file, a computing device performing the steps of determining whether said flag is in said first state; and
if said flag is in said first state, then determining a size for said audio data chunk based on a file size of said single audio file and a starting position of said last chunk in said single audio file; and
if said flag is not in said first state, then determining a size for said audio data chunk by reading audio data chunk size information stored in said single audio file.

2. The method of claim 1, further comprising setting said flag to a second state in response to successfully storing said audio data chunk in said single audio file.

3. The method of claim 2, wherein:
said flag is a parameter that indicates the size of the audio data chunk;
said parameter is initially set to a value that does not correspond to a valid audio data chunk size; and
the step of setting said flag to a second state in response to successfully storing said audio data chunk in said single audio file includes setting said parameter to a value that reflects an actual size of said audio data chunk.

4. The method of claim 1, further comprising setting said flag to a second state in response to adding to said single audio file a chunk that follows said audio data chunk within said single audio file.

5. The method of claim 1, further comprising setting said flag to a second state in response to adding audio data to said audio data chunk.

6. The method of claim 1, wherein:
the flag is a parameter that indicates the size of said audio data chunk; and
the parameter is initially set to a value that does not correspond to a valid audio data chunk size.

7. The method of claim 1, further comprising:
if said flag is in said first state, then determining, based on a file size of said single audio file and a starting position of said last chunk in said single audio file, a particular size value that indicates a size of said audio data chunk; and
setting said flag to said particular size value.

8. A computer-readable storage medium storing one or more sequences of instructions which, when executed by one or more processors, causes the one or more processors to perform:
storing a set of chunks in a single audio file, wherein said set of chunks includes an audio data chunk and a plurality of metadata chunks;
wherein each chunk of said set of chunks includes metadata indicating a chunk size;
storing, as part of said single audio file, a flag that initially is in a first state to indicate that a last chunk in said single audio file is said audio data chunk that contains audio data;
while parsing said single audio file, performing the steps of determining whether said flag is in said first state; and
if said flag is in said first state, then determining a size for said audio data chunk based on a file size of said single audio file and a starting position of said last chunk in said single audio file; and
if said flag is not in said first state, then determining a size for said audio data chunk by reading audio data chunk size information stored in said single audio file.

9. The computer-readable medium of claim 8, wherein said one or more sequences of instructions which, when executed by one or more processors, causes the one or more processors to perform:
setting said flag to a second state in response to successfully storing said audio data chunk in said single audio file.

10. The computer-readable medium of claim 9, wherein:
said flag is a parameter that indicates the size of the audio data chunk;
said parameter is initially set to a value that does not correspond to a valid audio data chunk size; and the step of setting said flag to a second state in response to successfully storing said audio data chunk in said single audio file includes setting said parameter to a value that reflects an actual size of said audio data chunk.

11. The computer-readable medium of claim 8, wherein said one or more sequences of instructions which, when executed by one or more processors, causes the one or more processors to perform:
setting said flag to a second state in response to adding to said single audio file a chunk that follows said audio data chunk within said single audio file.

12. The computer-readable medium of claim 8, wherein said one or more sequences of instructions which, when executed by one or more processors, causes the one or more processors to perform:
setting said flag to a second state in response to adding audio data to said audio data chunk.

13. The computer-readable medium of claim 8, wherein:
the flag is a parameter that indicates the size of said audio data chunk; and
the parameter is initially set to a value that does not correspond to a valid audio data chunk size.

14. The computer-readable medium of claim 8, the computer-readable medium further storing one or more sequences of instructions which, when executed by one or more processors, cause:
if said flag is in said first state, then determining, based on a file size of said single audio file and a starting position of said last chunk in said single audio file, a particular size value that indicates a size of said audio data chunk; and
setting said flag to said particular size value.

15. A method for handling audio information, comprising:
storing, as part of an audio file,
(a) audio data;
(b) metadata information that includes one or more metadata values that have a dependency on a particular state of the audio data;
(c) state information for said audio data that identifies a current version of said audio data; and
(d) one or more dependency indicators, wherein each of the one or more dependency indicators is associated with one or more of the one or more metadata values, wherein each dependency indicator identifies a version of the audio data on which the one or more metadata values that are associated with said each dependency indicator are dependent; and
while parsing said audio file, a computing device determining whether a metadata value of said one or more metadata values is valid based on a comparison between a dependency indicator associated with the metadata value and the state information for said audio data.

16. The method of claim 15, further comprising changing said state information in response to changes made to said audio data.

17. The method of claim 15, further comprising initially setting the one or more dependency indicators to a value that corresponds to said state information for said audio data.

18. The method of claim 15, wherein said one or more metadata values include a plurality of metadata values, each of which has a distinct dependency indicator.

19. The method of claim 15, wherein:
a dependency indicator associated with a particular metadata value of said one or more metadata values corresponds to an outdated state of said audio data; and
the method further comprises
setting said particular metadata value to a new value that is derived from a current state of said audio data; and
in response to setting said particular metadata to said new value, changing said dependency indicator for said particular metadata value to a value that corresponds to said current state information for said audio data.

20. The method of claim 15, wherein:
said audio file stores said metadata information in one or more metadata chunks;
said audio file stores said audio data in an audio data chunk; and
each of said one or more dependency indicators corresponds to a metadata chunk of said one or more metadata chunks, and indicates what version of said data chunk was used to derive metadata values within said metadata chunk.

21. The method of claim 15, wherein storing one or more dependency indicators associated with said one or more metadata values includes storing a dependency indicator associated with a metadata value that represents a maximum amplitude within said audio data.

22. The method of claim 15, wherein storing one or more dependency indicators associated with said one or more metadata values includes storing a dependency indicator associated with a metadata value that represents a minimum amplitude within said audio data.

23. The method of claim 15, wherein storing one or more dependency indicators associated with said one or more metadata values includes storing a dependency indicator associated with a metadata value that identifies a frame, in said audio data, in which a maximum amplitude occurs within said audio data.

24. A computer-readable storage medium storing one or more sequences of instructions which, when executed by one or more processors, causes the one or more processors to perform:
storing, as part of an audio file,
(a) audio data;
(b) metadata information that includes one or more metadata values that have a dependency on a particular state of the audio data;
(c) state information for said audio data that identifies a current version of said audio data; and
(d) one or more dependency indicators, wherein each of the one or more dependency indicators is associated with one or more of the one or more metadata values, wherein each dependency indicator identifies a version of the audio data on which the one or more metadata values that are associated with said each dependency indicator are dependent; and
while parsing said audio file, determining whether a metadata value of said one or more metadata values is valid based on a comparison between a dependency indicator associated with the metadata value and the state information for said audio data.

25. The computer-readable medium of claim 24, wherein said one or more sequences of instructions which, when executed by one or more processors, causes the one or more processors to perform:
changing said state information in response to changes made to said audio data.

26. The computer-readable medium of claim 24, wherein said one or more sequences of instructions which, when executed by one or more processors, causes the one or more processors to perform:

initially setting the one or more dependency indicators to a value that corresponds to said state information for said audio data.

27. The computer-readable medium of claim 24, wherein said one or more metadata values include a plurality of metadata values, each of which has a distinct dependency indicator.

28. The computer-readable medium of claim 24, wherein a dependency indicator associated with a particular metadata value of said one or more metadata values corresponds to an outdated state of said audio data; and
said one or more sequences of instructions which, when executed by one or more processors, causes the one or more processors to perform
setting said particular metadata value to a new value that is derived from a current state of said audio data; and
in response to setting said particular metadata to said new value, changing said dependency indicator for said particular metadata value to a value that corresponds to said current state information for said audio data.

29. The computer-readable medium of claim 24, wherein:
said audio file stores said metadata information in one or more metadata chunks;
said audio file stores said audio data in an audio data chunk; and
each of said one or more dependency indicators corresponds to a metadata chunk of said one or more metadata chunks, and indicates what version of said data chunk was used to derive metadata values within said metadata chunk.

30. The computer-readable medium of claim 24, wherein storing one or more dependency indicators associated with said one or more metadata values includes storing a dependency indicator associated with a metadata value that represents a maximum amplitude within said audio data.

31. The computer-readable medium of claim 24, wherein storing one or more dependency indicators associated with said one or more metadata values includes storing a dependency indicator associated with a metadata value that represents a minimum amplitude within said audio data.

32. The computer-readable medium of claim 24, wherein storing one or more dependency indicators associated with said one or more metadata values includes storing a dependency indicator associated with a metadata value that identifies a frame, in said audio data, in which a maximum amplitude occurs within said audio data.

33. A method for storing audio information, the method comprising:
storing a set of chunks in a single audio file, wherein said set of chunks includes an audio data chunk and a plurality of metadata chunks;
wherein said audio data chunk includes packets that correspond to a stream of encoded audio;
wherein each chunk of said set of chunks includes metadata indicating
a chunk version;
a chunk size; and
a chunk type;
wherein said set of chunks includes a format chunk that precedes said audio data chunk in said single audio file, said format chunk including metadata indicating a number of sample frames per second of said audio data in said stream;
data indicating the general kind of data in said stream;
how many bytes are in each packet of data;
how many sample frames are in each packet of data;
how many channels are in each frame of data;
how many bits of sample data are for each channel in a frame of data;
wherein at least one of said metadata chunks includes a flag that initially is in a first state to indicate that a last chunk in said single audio file is said audio data chunk that contains said audio data;
while parsing said single audio file, a computing device performing the steps of determining whether said flag is in said first state; and
if said flag is in said first state, then determining a size for said audio data chunk based on a file size of said single audio file and a starting position of said last chunk in said single audio file; and
if said flag is not in said first state, then determining a size for said audio data chunk by reading audio data chunk size information stored in said single audio file;
storing, as part of said single audio file,
metadata information that includes one or more metadata values that have a dependency on a particular state of said audio data;
state information for said audio data that identifies a current version of said audio data; and
one or more dependency indicators, wherein each of the one or more dependency indicators is associated with one or more of said one or more metadata values, wherein each dependency indicator identifies a version of the audio data on which the one or more metadata values that are associated with said each dependency indicator are dependent;
changing said state information in response to changes made to said audio data; and
while parsing said single audio file, a computing device determining whether a metadata value of said one or more metadata values is valid based on a comparison between a dependency indicator associated with said metadata value and said state information for said audio data.

34. The method of claim 33, wherein said data indicating the general kind of data in said stream indicates a specific format of said stream, selected from a set of formats consisting of:
Linear PCM,
ADPCM,
MPEG-4 AAC,
MACE 3:1,
MACE 6:1,
µLaw 2:1,
aLaw 2:1,
MPEG-1, MPEG-2 or MPEG 2.5, Layer 3 audio,
AC-3, and
AC-3 packaged for transport over an JEC 60958 compliant digital audio interface.

35. The method of claim 33, wherein:
said metadata about how many bytes are in each packet indicates that said audio data is encoded in a format, of said plurality of formats, that has a variable packet size; and
at least one of said metadata chunks includes packet size information that indicates sizes for packets in said audio stream.

36. The method of claim 35, wherein at least one of said metadata chunks includes:
metadata that indicates how many sample frames that said audio stream uses for priming or processing latency; and metadata that indicates how many sample frames, in a last packet that contains actual audio data, in said audio stream follow a last sample frame of actual audio data.

37. The method of claim 33, wherein:
said metadata about how many sample frames are in each packet indicates that said audio data is encoded in a format, of said plurality of formats, that has a variable number of sample frames per packet; and
at least one of said metadata chunks includes frame count information that indicates how many sample frames are in packets in said audio stream.

38. The method of claim 37, wherein at least one of said metadata chunks includes:
metadata that indicates how many sample frames that said audio stream uses for priming or processing latency; and
metadata that indicates how many sample frames, in a last packet that contains actual audio data, in said audio stream follow a last sample frame of actual audio data.

39. A computer-readable storage medium storing one or more sequences of instructions which, when executed by one or more processors, causes the one or more processors to perform:
storing a set of chunks in a single audio file, wherein said set of chunks includes an audio data chunk and a plurality of metadata chunks;
wherein said audio data chunk includes packets that correspond to a stream of encoded audio;
wherein each chunk of said set of chunks includes metadata indicating
a chunk version;
a chunk size; and
a chunk type;
wherein said set of chunks includes a format chunk that precedes said audio data chunk in said single audio file, said format chunk including metadata indicating a number of sample frames per second of said audio data in said stream;
data indicating the general kind of data in said stream;
how many bytes are in each packet of data;
how many sample frames are in each packet of data;
how many channels are in each frame of data;
how many bits of sample data are for each channel in a frame of data;
wherein at least one of said metadata chunks includes a flag that initially is in a first state to indicate that a last chunk in said single audio file is said audio data chunk that contains said audio data;
while parsing said single audio file, performing the steps of
determining whether said flag is in said first state; and
if said flag is in said first state, then determining a size for said audio data chunk based on a file size of said single audio file and a starting position of said last chunk in said single audio file; and
if said flag is not in said first state, then determining a size for said audio data chunk by reading audio data chunk size information stored in said single audio file;
storing, as part of said single audio file,
metadata information that includes one or more metadata values that have a dependency on a particular state of said audio data;
state information for said audio data that identifies a current version of said audio data; and
one or more dependency indicators, wherein each of the one or more dependency indicators is associated with one or more of said one or more metadata values, wherein each dependency indicator identifies a version of the audio data on which the one or more metadata values that are associated with said each dependency indicator are dependent;
changing said state information in response to changes made to said audio data; and
while parsing said single audio file, determining whether a metadata value of said one or more metadata values is valid based on a comparison between a dependency indicator associated with said metadata value and said state information for said audio data.

40. The computer-readable medium of claim 39, wherein said data indicating the general kind of data in said stream indicates a specific format of said stream, selected from a set of formats consisting of:
Linear PCM,
ADPCM,
MPEG-4 AAC,
MACE 3:1,
MACE 6:1,
μLaw 2:1,
aLaw 2:1,
MPEG-1, MPEG-2 or MPEG 2.5, Layer 3 audio,
AC-3, and
AC-3 packaged for transport over an JEC 60958 compliant digital audio interface.

41. The computer-readable medium of claim 39, wherein:
said metadata about how many bytes are in each packet indicates that said audio data is encoded in a format, of said plurality of formats, that has a variable packet size; and
at least one of said metadata chunks includes packet size information that indicates sizes for packets in said audio stream.

42. The computer-readable medium of claim 41, wherein at least one of said metadata chunks includes:
metadata that indicates how many sample frames that said audio stream uses for priming or processing latency; and
metadata that indicates how many sample frames, in a last packet that contains actual audio data, in said audio stream follow a last sample frame of actual audio data.

43. The computer-readable medium of claim 39, wherein:
said metadata about how many sample frames are in each packet indicates that said audio data is encoded in a format, of said plurality of formats, that has a variable number of sample frames per packet; and
at least one of said metadata chunks includes frame count information that indicates how many sample frames are in packets in said audio stream.

44. The computer-readable medium of claim 43, wherein at least one of said metadata chunks includes:
metadata that indicates how many sample frames that said audio stream uses for priming or processing latency; and
metadata that indicates how many sample frames, in a last packet that contains actual audio data, in said audio stream follow a last sample frame of actual audio data.

* * * * *

UNITED STATES PATENT AND TRADEMARK OFFICE
CERTIFICATE OF CORRECTION

PATENT NO.       : 7,624,021 B2                                      Page 1 of 1
APPLICATION NO.  : 10/883898
DATED            : November 24, 2009
INVENTOR(S)      : Stewart et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1421 days.

Signed and Sealed this

Fourteenth Day of December, 2010

David J. Kappos
*Director of the United States Patent and Trademark Office*